(12) United States Patent
Youn et al.

(10) Patent No.: US 12,456,278 B2
(45) Date of Patent: Oct. 28, 2025

(54) ELECTRONIC DEVICE AND METHOD FOR TRACKING REGIONS OF INTEREST IN THE ELECTRONIC DEVICE

(71) Applicant: Samsung Electronics Co., Ltd., Suwon-si (KR)

(72) Inventors: Sungwook Youn, Suwon-si (KR); Yanggeun Oh, Suwon-si (KR); Byungjun Son, Suwon-si (KR); Sungjoo Ahn, Suwon-si (KR); Jiyoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 17/586,040

(22) Filed: Jan. 27, 2022

(65) Prior Publication Data

US 2022/0366664 A1     Nov. 17, 2022

Related U.S. Application Data

(63) Continuation of application No. PCT/KR2022/001143, filed on Jan. 21, 2022.

(30) Foreign Application Priority Data

May 12, 2021  (KR) .................. 10-2021-0061505
Jul. 23, 2021  (KR) .................. 10-2021-0096836

(51) Int. Cl.
*G06K 9/00*  (2022.01)
*G06T 7/00*  (2017.01)
(Continued)

(52) U.S. Cl.
CPC ............. *G06V 10/25* (2022.01); *G06T 7/97* (2017.01); *G06V 40/161* (2022.01); *G06T 2207/30201* (2013.01)

(58) Field of Classification Search
CPC ................. G06V 10/25; G06T 2207/30201
See application file for complete search history.

(56) References Cited

U.S. PATENT DOCUMENTS 11,704,908 B1 *  7/2023  Xu ..................... G06V 40/172
                                            382/181
2009/0097707 A1   4/2009  Yi et al.
(Continued)

FOREIGN PATENT DOCUMENTS

JP       2011-035634 A      2/2011
KR    10-2009-0037700 A     4/2009
(Continued)

OTHER PUBLICATIONS

Funahasahi, Takuma, et al. "Hierarchical face tracking by using PTZ camera." Sixth IEEE International Conference on Automatic Face and Gesture Recognition, 2004. Proceedings.. IEEE, 2004. (Year: 2004).*

(Continued)

*Primary Examiner* — Gregory A Morse
*Assistant Examiner* — Owais Iqbal Memon
(74) *Attorney, Agent, or Firm* — Jefferson IP Law, LLP

(57) ABSTRACT

An electronic device is provided. The electronic device includes a camera module, a display, a plurality of detectors, and at least one processor, and the at least one processor may be configured to detect at least one first region of interest (ROI) in a first image received through the camera module by using a first detector for first ROI detection among the plurality of detectors, detect at least one second ROI in a second image received through the camera module by using a second detector for second ROI detection among the plurality of detectors when failing in detecting at least one first ROI matching the at least one first ROI detected in the first image in the second image by using the first detector, estimate at least one first ROI based on the at least one (Continued)

second ROI, update the estimated at least one first ROI to at least one first ROI when the at least one first ROI detected in the first image matches the estimated at least one first ROI, and change a position of a preview region including the updated at least one first ROI based on a position of the estimated at least one first ROI matching the at least one first ROI detected in the first image.

20 Claims, 12 Drawing Sheets

(51) Int. Cl.
    *G06V 10/25*     (2022.01)
    *G06V 40/16*     (2022.01)

(56) References Cited

U.S. PATENT DOCUMENTS

| | | |
|---|---|---|
| 2011/0052013 A1 | 3/2011 | Sasahara et al. |
| 2011/0141219 A1 | 6/2011 | Yeh |
| 2013/0182062 A1 | 7/2013 | Son et al. |
| 2014/0184726 A1* | 7/2014 | Kim ............ H04N 23/635 348/14.07 |
| 2014/0185875 A1* | 7/2014 | Tsuji ............ H04N 23/611 382/103 |
| 2014/0267834 A1 | 9/2014 | Aoki |
| 2015/0154455 A1 | 6/2015 | Sun |
| 2015/0296132 A1 | 10/2015 | Kumano |
| 2016/0191811 A1* | 6/2016 | Tsubusaki ............ G06V 10/25 348/240.1 |
| 2016/0381282 A1 | 12/2016 | Bandlamudi et al. |
| 2017/0330569 A1 | 11/2017 | Yoshikawa et al. |
| 2018/0173393 A1* | 6/2018 | Verdier ............ G06V 40/16 |
| 2018/0300540 A1* | 10/2018 | Swisher ............ G06N 3/045 |
| 2020/0013190 A1 | 1/2020 | Li et al. |
| 2020/0175697 A1 | 6/2020 | Jeon et al. |

FOREIGN PATENT DOCUMENTS

| | | |
|---|---|---|
| KR | 10-2010-0094560 A | 8/2010 |
| KR | 10-2011-0119214 A | 11/2011 |
| KR | 10-2013-0083153 A | 7/2013 |
| KR | 10-2018-0086803 A | 8/2018 |
| KR | 10-2019-0095200 A | 8/2019 |
| KR | 10-2021-0015697 A | 2/2021 |

OTHER PUBLICATIONS

International Search Report dated May 3, 2022, issued in International Application No. PCT/KR2022/001143.
European Search Report dated May 8, 2024, issued in European Application No. 22807581.8.
European Examination Report dated Jul. 31, 2025, issued in European Application No. 22 807 581.8.
Korean Examination Report dated Aug. 21, 2025, issued in Korean Application No. 10-2021-0096836.

* cited by examiner

ELECTRONIC DEVICE AND METHOD FOR TRACKING REGIONS OF INTEREST IN THE ELECTRONIC DEVICE

CROSS-REFERENCE TO RELATED APPLICATION(S)

This application is a continuation application, claiming priority under § 365(c), of an International application No. PCT/KR2022/001143, filed on Jan. 21, 2022, which is based on and claims the benefit of a Korean patent application number 10-2021-0061505, filed on May 12, 2021, in the Korean Intellectual Property Office, and of a Korean patent application number 10-2021-0096836, filed on Jul. 23, 2021, in the Korean Intellectual Property Office, the disclosure of each of which is incorporated by reference herein in its entirety.

TECHNICAL FIELD

The disclosure relates to an electronic device and a method for capturing an image in the electronic device. More particularly, the disclosure relates to an electronic device that continuously detects a region of interest (ROI) during capturing an image and provide the ROI at the center of a screen.

BACKGROUND ART

More and more services and additional functions are provided through an electronic device, for example, a portable electronic device, such as a smartphone. To increase the utility of electronic devices and satisfy the demands of various users, communication service providers or electronic device manufacturers are competitively developing electronic devices to provide various functions and differentiate them from other companies. Accordingly, various functions provided through the electronic devices are also advanced.

In an image capturing function (e.g., a video call, photo taking, and/or video recording) among various functions provided through an electronic device, when a region of interest (ROI) (e.g., a face region) is set during image capturing, a function, such as zooming/panning is applied to always position the ROI at the center of a display screen.

The above information is presented as background information only to assist with an understanding of the disclosure. No determination has been made, and no assertion is made, as to whether any of the above might be applicable as prior art with regard to the disclosure.

DISCLOSURE

Technical Problem

When the electronic device fails in detecting a subject during image capturing, for example, when the face of a subject set as a ROI is partially covered with a mask and thus the ROI is not detected, the function of positioning the ROI at the center of a display screen, such as zooming/panning, may be deactivated.

Aspects of the disclosure are to address at least the above-mentioned problems and/or disadvantages and to provide at least the advantages described below. Accordingly, an aspect of the disclosure is to provide an electronic device and a method for capturing an image in the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a camera module, a display, a plurality of detectors, and at least one processor, and the at least one processor may be configured to detect at least one first region of interest (ROI) in a first image received through the camera module by using a first detector for first ROI detection among the plurality of detectors, detect at least one second ROI in a second image received through the camera module by using a second detector for second ROI detection among the plurality of detectors when failing in detecting at least one first ROI matching the at least one first ROI detected in the first image in the second image by using the first detector, estimate at least one first ROI based on the at least one second ROI, update the estimated at least one first ROI to at least one first ROI when the at least one first ROI detected in the first image matches the estimated at least one first ROI, and change a position of a preview region including the updated at least one first ROI based on a position of the estimated at least one first ROI matching the at least one first ROI detected in the first image.

In accordance with another aspect of the disclosure, a method for capturing an image in an electronic device is provided. The method includes detecting at least one first ROI in a first image received through a camera module by using a first detector for first ROI detection among a plurality of detectors, detecting at least one second ROI in a second image received through the camera module by using a second detector for second ROI detection among the plurality of detectors when failing in detecting at least one first ROI matching the at least one first ROI detected in the first image in the second image by using the first detector, estimating at least one first ROI based on the at least one second ROI, updating the estimated at least one first ROI to at least one first ROI when the at least one first ROI detected in the first image matches the estimated at least one first ROI, and changing a position of a preview region including the updated at least one first ROI based on a position of the estimated at least one first ROI matching the at least one first ROI detected in the first image.

Advantageous Effects

According to various embodiments of the disclosure, an electronic device continuously detects a ROI during capturing an image and provide the ROI at the center of a screen.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
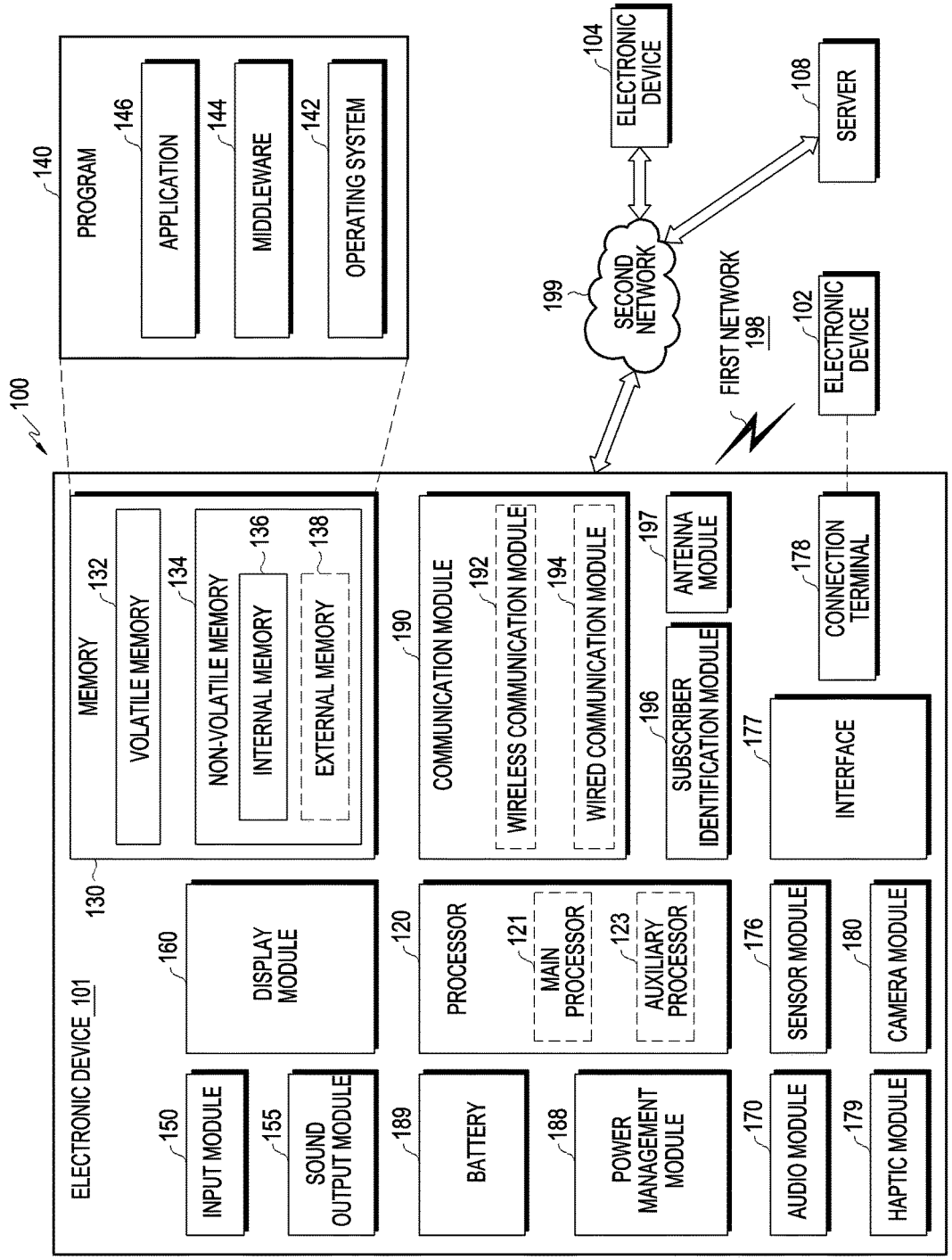
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., a LAN or wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
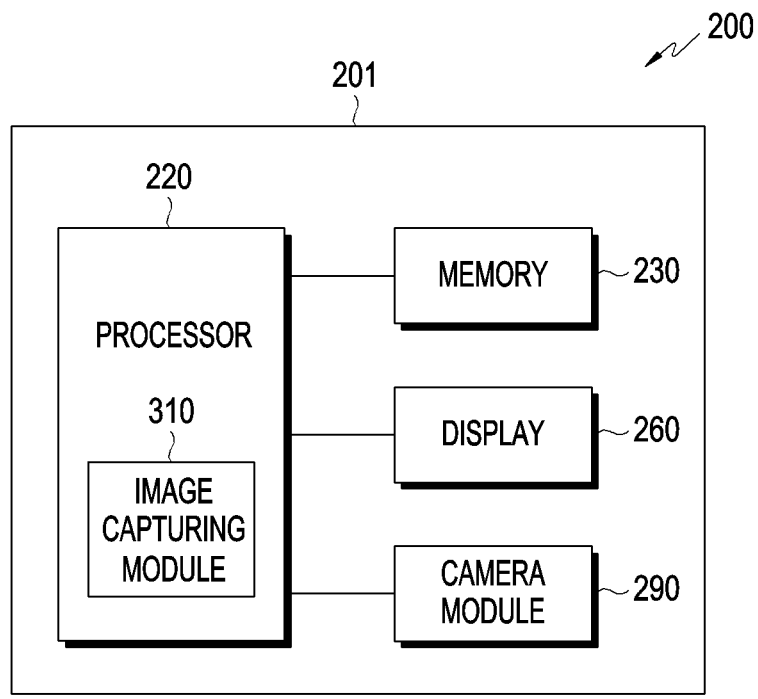
FIG. 2 is a block diagram illustrating an electronic device according to an embodiment of the disclosure.

FIG. 2 is a block diagram 200 illustrating an electronic device according to an embodiment of the disclosure.

Referring to FIG. 2, an electronic device 201 (e.g., the electronic device 101 of FIG. 1) may include a processor 220, a memory 230, a display 260, and a camera module 290.

According to various embodiments of the disclosure, the processor 220 may provide overall control to the operations of the electronic device 201. The processor 220 may be identical to the processor 120 of FIG. 1 or may perform at least one function or operation performed in the processor 120.

According to various embodiments of the disclosure, the processor 220 may include an image capturing module 310 which may continuously detect a region of interest (ROI) by using a plurality of detectors, while capturing an image, and change a preview image displayed on the display 260 according to a ROI change.

According to an embodiment of the disclosure, the processor 220 may control the image capturing module 310 or perform the same function as the image capturing module 310.

According to an embodiment of the disclosure, the image capturing module 310 may be included in the processor 220 or included as a separate module in the electronic device 201. The image capturing module 310 will be described with reference to FIG. 3 below.

According to various embodiments of the disclosure, the memory 230 may be implemented substantially the same as or similar to the memory 130 of FIG. 1.

According to various embodiments of the disclosure, the display 260 may be implemented substantially the same as or similar to the display module 160 of FIG. 1. According to an embodiment of the disclosure, the display 260 may display a preview image including a ROI during image capturing.

According to various embodiments of the disclosure, the camera module 290 may be implemented substantially the same as or similar to the camera module 180 of FIG. 1.

Figure 3:
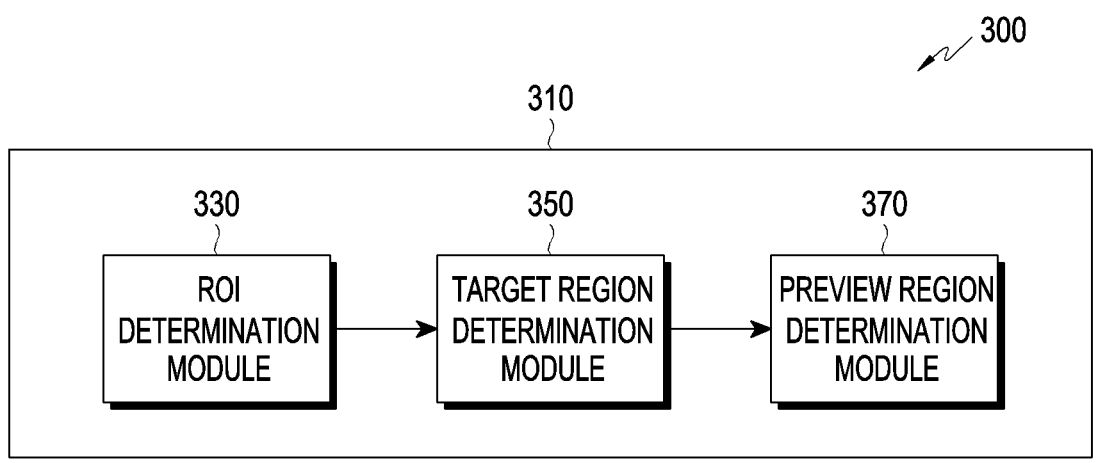
FIG. 3 is a block diagram illustrating an image capturing module in an electronic device according to an embodiment of the disclosure.
Figure 4A:
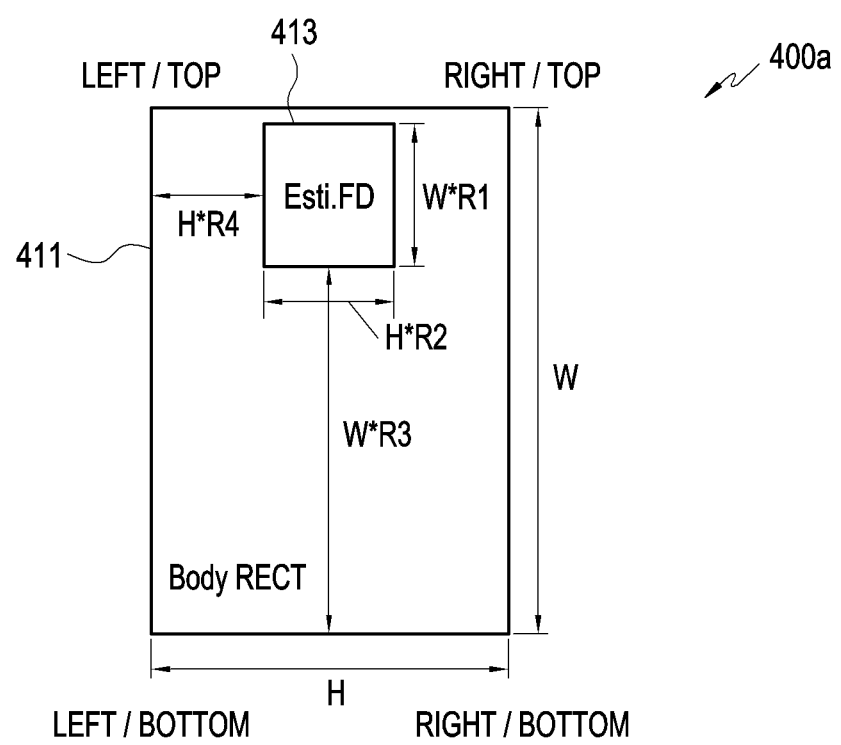
FIGS. 4A and 4B are diagrams illustrating an estimation function for estimating a first region of interest (ROI) based on a second ROI in an electronic device according to various embodiments of the disclosure.
Figure 4B:
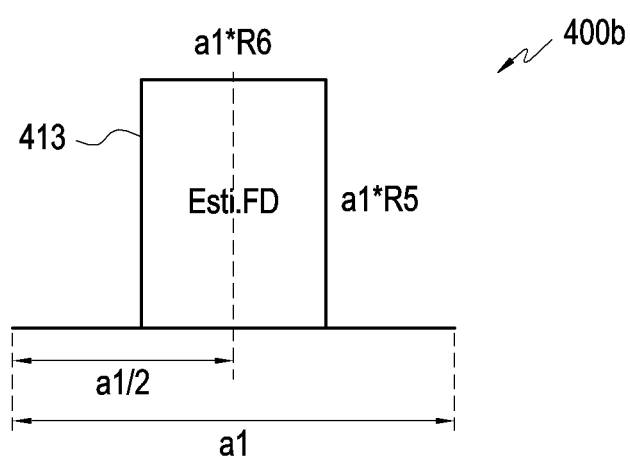
Figure 5:
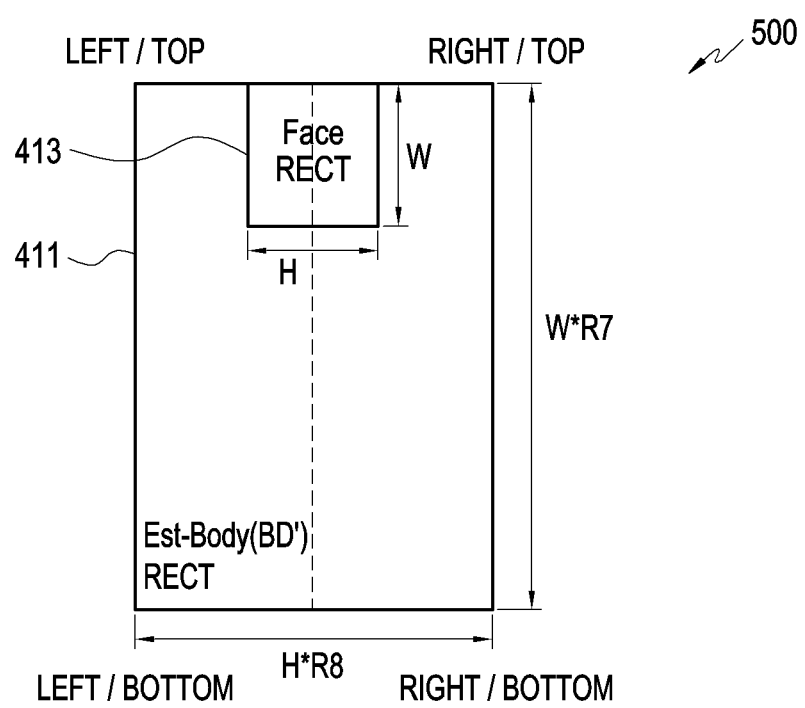
FIG. 5 is a diagram illustrating an estimation function for estimating a second ROI based on a first ROI in an electronic device according to an embodiment of the disclosure.
Figure 6A:
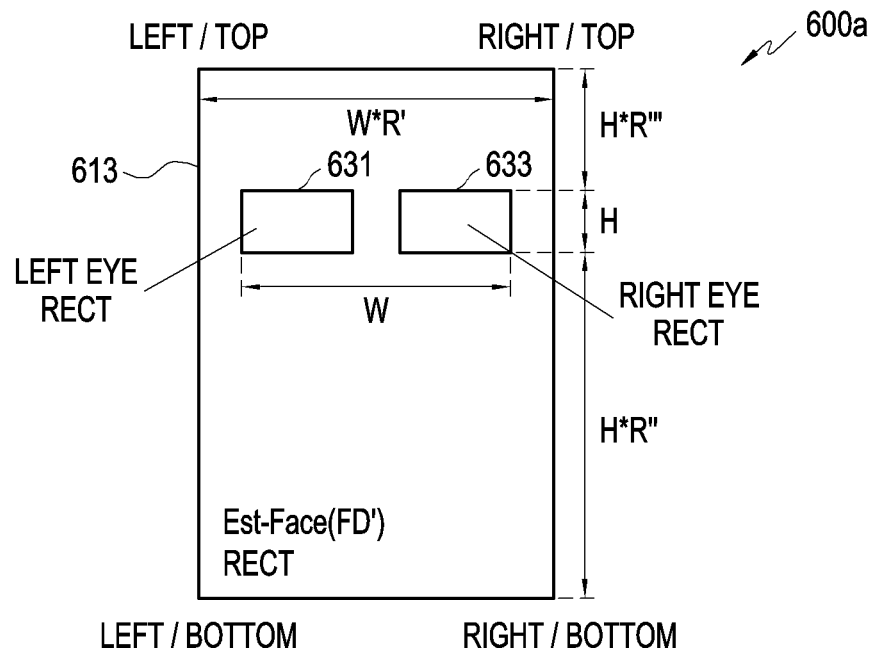
FIGS. 6A, 6B, 6C, and 6D are diagrams illustrating an estimation function for estimating a first ROI based on a third ROI in an electronic device according to various embodiments of the disclosure.
Figure 6B:
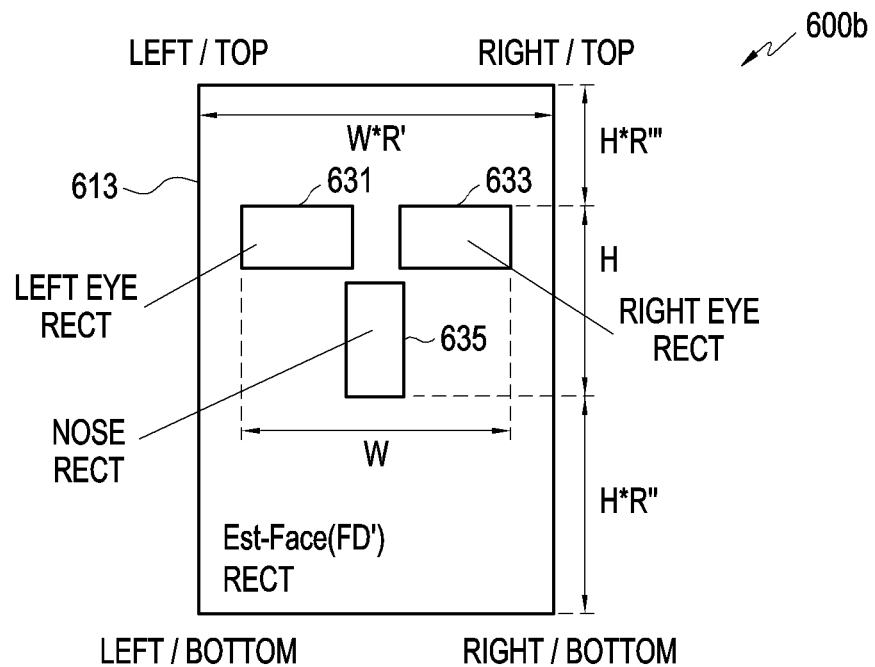
Figure 6C:
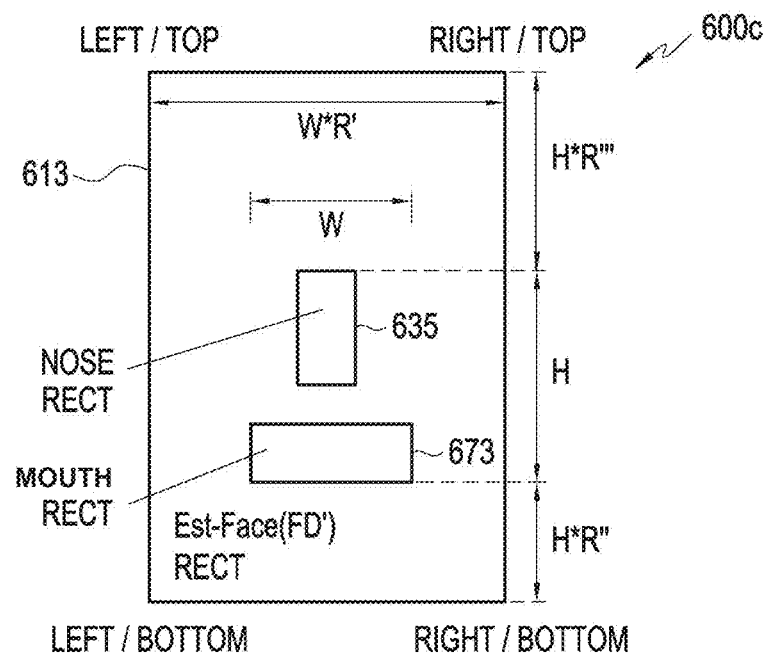
Figure 6D:
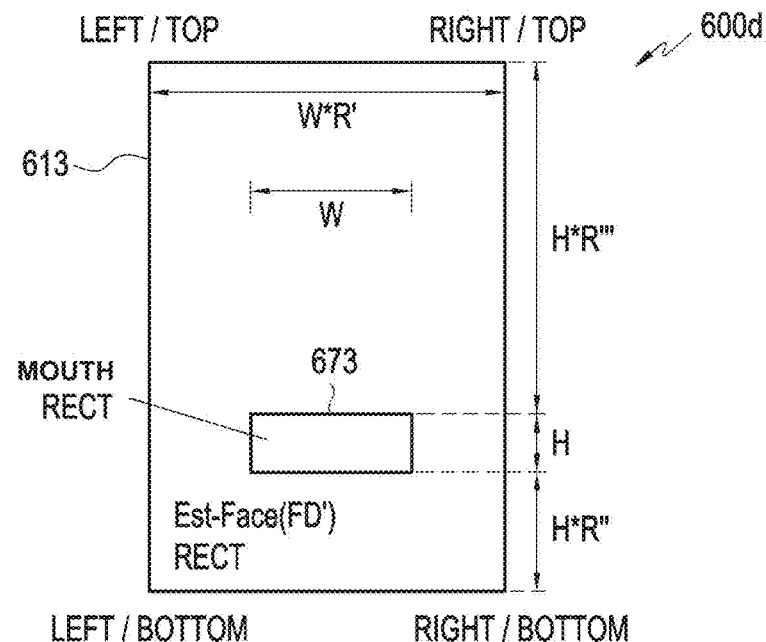
Figure 7:
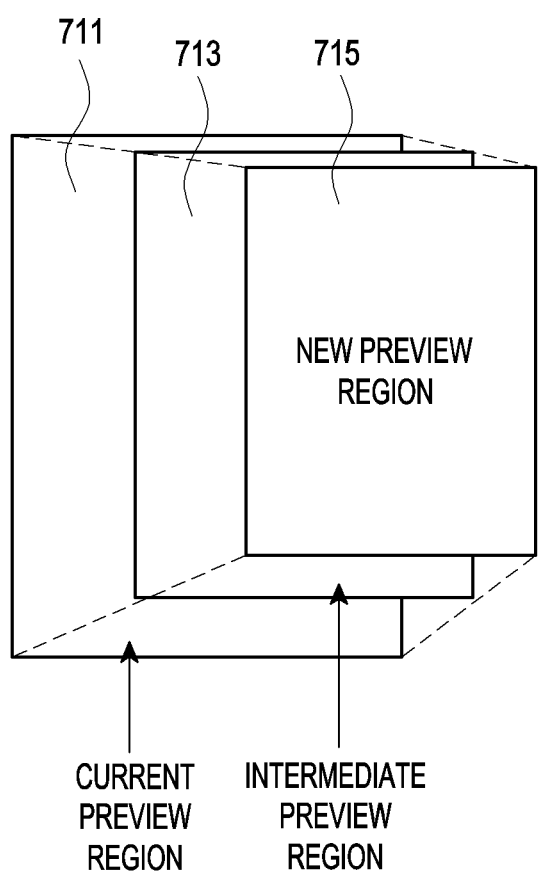
FIG. 7 is a diagram illustrating movement of a preview image along with movement of a subject in an electronic device according to an embodiment of the disclosure.

FIG. 3 is a block diagram 300 illustrating an image capturing module of an electronic device according to an embodiment of the disclosure, FIGS. 4A and 4B are diagrams 400a and 400b illustrating an estimation function for estimating a first ROI based on a second ROI in an electronic device according to various embodiments of the disclosure, FIG. 5 is a diagram 500 illustrating an estimation function for estimating a second ROI based on a first ROI in an electronic device according to an embodiment of the disclosure, FIGS. 6A, 6B, 6C, and 6D are diagrams 600a to 600d illustrating an estimation function for estimating a first ROI based on a third ROI in an electronic device according to various embodiments of the disclosure, and FIG. 7 is a diagram 700 illustrating movement of a preview image along with movement of a subject in an electronic device according to an embodiment of the disclosure.

Referring to FIG. 3, the image capturing module 310 may include a ROI determination module 330, a target region determination module 350, and a preview region determination module 370.

According to various embodiments of the disclosure, the ROI determination module 330 (e.g., the processor 220 of FIG. 2) may detect a ROI in an image received through the camera module 290.

According to an embodiment of the disclosure, the ROI determination module 330 may detect a ROI in an image received from the camera module 290 by using a plurality of detectors during image capturing, crop the ROI in the image, and perform a zooming function and/or a panning function to position the cropped ROI at the center of a display (e.g., the display 260 of FIG. 2) at a certain ratio.

According to an embodiment of the disclosure, the ROI determination module 330 may include a plurality of detectors, and the plurality of detectors may include ROI detectors for detecting different ROIs. For example, the plurality of detectors may include a face detector for detecting a face, a body detector for detecting a body, a face attribute detector for detecting a face feature, and may further include other feature detectors. Each of the plurality of detectors may detect information about the coordinates (e.g., left coordinate, right coordinate, top coordinate, and bottom coordinate) of a ROI among a plurality of ROIs, and the plurality of detectors may operate in a set order or simultaneously.

According to an embodiment of the disclosure, when a first ROI is set among the plurality of ROIs, the ROI determination module 330 may determine a first detector for detecting a first ROI as a main detector from among the plurality of detectors. The ROI determination module 330 may determine, as an auxiliary detector, at least one detector except for the first detector determined as the main detector from among the plurality of detectors, and identify an order of applying the at least one detector determined as the auxiliary detector for detecting a first ROI based on the order which has been set when the first detector is determined as the main detector. The ROI determination module 330 may preset and store the order of applying the at least one auxiliary detector for detecting a ROI according to the type of the determined main detector.

According to various embodiments of the disclosure, the ROI determination module 330 (e.g., the processor 220 of FIG. 2) may detect at least one first ROI in each of at least one image through the camera module 290 by using the plurality of detectors sequentially, and update the detected at least one first ROI.

According to various embodiments of the disclosure, upon detection of at least one first ROI (e.g., N face regions) in a first image received through the camera module by using the first detector (e.g., a face detector) for detecting a first ROI (e.g., a face region), set as the main detector among the plurality of detectors, the ROI determination module 330 may update the detected at least one first ROI (e.g., N face regions) to at least one first ROI. The first ROI (e.g., a face region) may be a ROI set from among a plurality of ROIs.

According to an embodiment of the disclosure, upon detection of at least one first ROI (e.g., M face regions) in a second image received through the camera module 290 by using the first detector (e.g., a face detector) after detecting the at least one ROI (e.g., N face regions) in the first image, the ROI determination module 330 may compare the at least one first ROI (e.g., N face regions) detected in the first image with the at least one first ROI (e.g., M face regions) detected in the second image by a region matching function. The region matching function may be described in the following Equation 1 and Equation 2.

When the at least one first ROI (e.g., M face regions) detected in the second image wholly matches the at least one first ROI (e.g., N face regions) detected in the first image (e.g., all of the first ROIs are the face of the same subject), the ROI determination module 330 may update at least one first ROI with the at least one first ROI (e.g., M (=K+L) face regions) detected in the second image.

When a part (e.g., K face regions) of the at least one first ROI (e.g., M (=K+L) face regions) detected in the second image matches a part (e.g., K face regions) of the at least one first ROI (e.g., N (=K+J) face regions) detected in the first image (e.g., some of the first ROIs are the face of the same subject), the ROI determination module 30 may update at least one ROI with the part (e.g., K face regions) of the at least one first ROI (e.g., M (=K+L) face regions) detected in the second image.

The ROI determination module 330 may determine a part (e.g., L face regions) of the at least one first ROI (e.g., M (=K+L) face regions) detected in the second image, which do not match the at least one first ROI (e.g., N (=K+J) face regions) detected in the first image, as a new first ROI (e.g., a face region of a new subject), and update at least one first ROI by adding the new first ROI (e.g., L face regions).

According to an embodiment of the disclosure, to detect a part (e.g., J face regions) of the at least one first ROI (e.g., N (=K+J) face regions), which the first detector has failed to detect, the ROI determination module 330 may detect at least one second ROI (e.g., P body regions) in the second image by the second detector (e.g., body detector) for detecting a second ROI (e.g., body region), which has been set as an auxiliary detector among the plurality of detectors, and estimate at least one first ROI (e.g., P face regions) based on the at least one second ROI (e.g., P body regions).

The ROI determination module 330 may estimate the at least one first ROI (e.g., P face regions) from the at least one second ROI (e.g., P body regions) by an estimation function. The estimation function will be described with reference to FIGS. 4A and 4B, FIG. 5, and FIGS. 6A to 6D.

The ROI determination module 330 may compare the part (e.g., J face region) of the at least one first ROI detected in the first image with the estimated at least one first ROI (e.g., P face regions) by the region matching function.

When the part (e.g., J face regions) of the at least one first ROI detected in the first image wholly matches the estimated at least one first ROI (e.g., P face regions), the ROI determination module 330 may update at least one first ROI with the estimated at least one first ROI (e.g., P face regions).

When a part (Q face regions) of the part (e.g., J (=Q+S) face regions) of the at least one first ROI detected in the first image matches a part (Q face regions) of the estimated at least one first ROI (e.g., P (=Q+S) face regions), the ROI determination module 30 may update at least one ROI with the part (e.g., Q face regions) of the estimated at least one first ROI (e.g., P (=Q+S) face regions).

The ROI determination module 330 may determine a part (e.g., R face regions) of the estimated at least one first ROI (e.g., P (=Q+R) face regions), which does not match the part (e.g., J (=Q+S) face regions) of the at least one first ROI detected in the first image, as a new first ROI (e.g., a face region of a new subject), and update at least one first ROI by adding the new first ROI (e.g., R face regions).

According to an embodiment of the disclosure, to detect a part (e.g., J face regions) of the at least one first ROI (e.g., N (=K+J) face regions), which the first detector has failed to detect, the ROI determination module 330 may detect at least one third ROI (e.g., T face feature regions) in the second image by the third detector (e.g., face attribute detector) for detecting a third ROI (e.g., face attribute region), which has been set as an auxiliary detector among the plurality of detectors, and estimate at least one first ROI (e.g., T face regions) based on the at least one third ROI (e.g., T face feature regions).

The ROI determination module 330 may estimate the at least one first ROI (e.g., T face regions) from the at least one third ROI (e.g., T face feature regions) by the estimation function. The estimation function will be described with reference to FIGS. 4A and 4B, FIG. 5, and FIGS. 6A to 6D.

The ROI determination module 330 may compare the part (e.g., J face regions) of the at least one first ROI detected in the first image with the estimated at least one first ROI (e.g., T face regions) by the region matching function.

When the part (e.g., J face regions) of the at least one first ROI detected in the first image wholly matches the estimated at least one first ROI (e.g., T face regions), the ROI determination module 330 may update at least one first ROI with the estimated at least one first ROI (e.g., T face regions).

When a part (Q face regions) of the part (e.g., J (=Q+S) face regions) of the at least one first ROI detected in the first image matches a part (Q face regions) of the estimated at least one first ROI (e.g., T (=Q+V) face regions), the ROI determination module 30 may update at least one ROI with the part (Q face regions) of the estimated at least one first ROI (e.g., T (=Q+V) face regions).

The ROI determination module 330 may determine a part (e.g., V face regions) of the estimated at least one first ROI (e.g., T (=Q+V) face regions), which does not match the part (e.g., J (=Q+S) face regions) of the at least one first ROI detected in the first image, as a new first ROI (e.g., a face region of a new subject), and update at least one first ROI by adding the new first ROI (e.g., V face regions).

According to various embodiments of the disclosure, upon detection of at least one second ROI (e.g., N body regions) in the first image received through the camera module by using the second detector (e.g., a body detector) for detecting a second ROI (e.g., a body region), set as a main detector among the plurality of detectors, the ROI determination module 330 may update the detected at least one second ROI (e.g., N body regions) to at least one second ROI. The second ROI (e.g., a body region) may represent a ROI set from among the plurality of ROIs.

According to an embodiment of the disclosure, when the ROI determination module 330 detects at least one second ROI (e.g., M body regions) in the second image received after the first image through the camera module 290 by using the second detector (e.g., a body detector) after detecting the at least one second ROI (e.g., N body regions) in the first image, the ROI determination module 330 may compare the at least one second ROI (e.g., N body regions) detected in the first image with the at least one second ROI (e.g., M body regions) detected in the second image by the region matching function. The region matching function may be described in the following Equation 1 and Equation 2.

When the at least one second ROI (e.g., N body regions) detected in the first image wholly matches the at least one second ROI (e.g., M body regions) detected in the second image (e.g., all of the second ROIs are the body of the same subject), the ROI determination module 330 may update at least one second ROI with the at least one second ROI (e.g., M (=K+L) body regions) detected in the second image.

When a part (e.g., K body regions) of the at least one second ROI (e.g., N (=K+J) body regions) detected in the first image matches a part (e.g., K body regions) of the at least one second ROI (e.g., M (=K+L) body regions) detected in the second image (e.g., some of the second ROIs are the body of the same subject), the ROI determination module 30 may update at least one second ROI with the part (e.g., K body regions) of the at least one second ROI (e.g., M (=K+L) body regions) detected in the second image.

The ROI determination module 330 may determine a part (e.g., L body regions) of the at least one second ROI (e.g., M (=K+L) body regions) detected in the second image, which does not match the at least one second ROI (e.g., N (=K+J) body regions) detected in the first image, as a new second ROI (e.g., the body region of a new subject), and update at least one second ROI by adding the new second ROI (e.g., L body regions).

According to an embodiment of the disclosure, to detect a part (e.g., J body regions) of the at least one second ROI (e.g., N (K+J) body regions) detected in the first image, which the second detector has failed to detect, the ROI determination module 330 may detect at least one first ROI (e.g., P face regions) in the second image by using the first detector (e.g., a face detector) for detecting a first ROI (e.g., a face region), which has been set as an auxiliary detector among the plurality of detectors, and estimate at least one second ROI (e.g., P body regions) based on the at least one first ROI (e.g., P face regions).

The ROI determination module 330 may estimate the at least one second ROI (e.g., P body regions) from the at least one first ROI (e.g., P face regions) by the estimation function. The estimation function will be described with reference to FIGS. 4A and 4B, FIG. 5, and FIGS. 6A to 6D.

The ROI determination module 330 may compare the part (e.g., J body regions) of the at least one second ROI detected in the first image with the estimated at least one second ROI (e.g., P body regions) by the region matching function.

When the part (e.g., J body regions) of the at least one second ROI detected in the first image wholly matches the estimated at least one second ROI (e.g., P body regions), the ROI determination module 330 may update at least one second ROI with the estimated at least one second ROI (e.g., P body regions).

When a part (Q body regions) of the part (e.g., J (=Q+S) body regions) of the at least one second ROI detected in the first image matches a part (Q body regions) of the estimated at least one second ROI (e.g., P (=Q+S) body regions), the ROI determination module 30 may update at least one second ROI with the part (e.g., Q body regions) of the estimated at least one second ROI (e.g., P (=Q+S) body regions).

The ROI determination module 330 may determine a part (e.g., R body regions) of the estimated at least one second ROI (e.g., P (=Q+R) body regions), which does not match the part (e.g., J (=Q+S) body regions) of the at least one second ROI detected in the first image, as a new second ROI (e.g., the body region of a new subject), and update at least one second ROI by adding the new second ROI (e.g., R body regions).

According to an embodiment of the disclosure, to detect a part (e.g., J body regions) of the at least one second ROI (e.g., N (=K+J) body regions), which the second detector has failed to detect, the ROI determination module 330 may detect at least one third ROI (e.g., P face feature regions) in the second image by the third detector (e.g., a face attribute detector) for detecting a third ROI (e.g., a face attribute region), which has been set as an auxiliary detector among the plurality of detectors, and estimate at least one first ROI (e.g., P face regions) based on the at least one third ROI (e.g., P face feature regions).

The ROI determination module 330 may estimate at least one second ROI (e.g., P body regions) from the at least one first ROI (e.g., P face regions) by the estimation function.

The estimation function will be described with reference to FIGS. 4A and 4B, FIG. 5, and FIGS. 6A to 6D.

The ROI determination module 330 may compare the part (e.g., J body regions) of the at least one second ROI detected in the first image with the estimated at least one second ROI (e.g., P body regions) by the region matching function.

When the part (e.g., J body regions) of the at least one second ROL detected in the first image wholly matches the estimated at least one second ROI (e.g., P body regions), the ROI determination module 330 may update the estimated at least one second ROI (e.g., P body regions) to at least one second ROI.

When a part (Q body regions) of the part (e.g., J (=Q+S) body regions) of the at least one second ROI detected in the first image matches a part (Q body regions) of the estimated at least one second ROI (e.g., P (=Q+R) body regions), the ROI determination module 30 may update the part (e.g., Q body regions) of the estimated at least one second ROI (e.g., P (=Q+R) body regions) to at least one second ROI.

The ROI determination module 330 may determine a part (e.g., R body regions) of the estimated at least one second ROI (e.g., P (=Q+R) face regions), which does not match the part (e.g., J (=Q+S) body regions) of the at least one second ROI detected in the first image, as a new second ROI (e.g., the body region of a new subject), and update at least one second ROI by adding the new second ROI (e.g., R body regions).

According to various embodiments of the disclosure, the ROI determination module 330 (e.g., the processor 220 of FIG. 2) may detect at least one first ROI in each of at least one image through the camera module 290 by using the plurality of detectors simultaneously, and update the detected at least one first ROI.

According to an embodiment of the disclosure, when determining all of the plurality of detectors as main detectors, the ROI determination module 330 may detect at least one ROI in an image received through the camera module by using the plurality of detectors simultaneously.

According to an embodiment of the disclosure, upon detection of at least one first ROI (e.g., N face regions) in a first image received through the camera module by simultaneously using the plurality of detectors (e.g., the first detector (e.g., a face detector), the second detector (e.g., a body detector), and the third detector (e.g., face attribute detector)), the ROI determination module 330 may update at least one ROI with the detected at least one first ROI (e.g., N face regions). The first ROI (e.g., a face region) may be a ROI set from among a plurality of ROIs.

According to an embodiment of the disclosure, after detecting the at least one first ROI (e.g., N face regions) in the first image, the ROI determination module 330 may detect at least one first ROI (e.g., M face regions) in a second image received after the first image through the camera module 290. The ROI determination module 330 may detect at least one second ROI (e.g., P body regions) in the second image by using the second detector (e.g., a body detector) among the plurality of detectors, and estimate at least one first ROI (e.g., P face regions) based on the at least one second ROI by the estimation function. The ROI determination module 330 may detect at least one third ROI (e.g., T face feature regions) in the second image by using the third detector (e.g., a face attribute body detector) among the plurality of detectors, and estimate at least one first ROI (e.g., T face regions) based on the at least one third ROI by the estimation function.

According to an embodiment of the disclosure, the ROI determination module 330 may compare the at least one first ROI (e.g., N face regions) detected in the first image with the first ROIs (e.g., M face regions, P face regions, and T face regions) detected through the plurality of detectors by the region matching function.

According to an embodiment of the disclosure, the ROI determination module 330 may update all or some of the first ROIs (e.g., M face regions, P face regions, and T face regions) detected through the plurality of detectors, which match the at least one first ROI (e.g., N face regions) detected in the first image, to at least one first ROI.

According to an embodiment of the disclosure, the ROI determination module 330 may update at least one first ROI by adding all or some of the first ROIs (e.g., M face regions, P face regions, and T face regions) detected through the plurality of detectors, which do not match the at least one first ROI (e.g., N face regions) detected in the first image, as new first ROIs.

According to various embodiments of the disclosure, the ROI determination module 330 (e.g., the processor 220 of FIG. 2) may transmit the updated at least one first ROI to the target region determination module 350.

According to various embodiments of the disclosure, the ROI determination module 330 (e.g., the processor 220 of FIG. 2) may determine whether a first ROI detected in the first image matches a first ROI detected in the second image by the region matching function.

According to an embodiment of the disclosure, the ROI determination module 330 may perform the region matching function by at least one of a plurality of equations using an interaction of union (IOU) included in Equation 1 below. When the result of matching based on at least one of the plurality of equations using an IOU included in Equation 1 is greater than or equal to a threshold (e.g., 75%), the ROI determination module 330 may determine that the first ROI (region A) detected in the first image and the first ROI (region B) detected in the second image are the same first ROI.

$$0 \leq IOU \leq 1$$

$$IOU(A,B) = size(A \cap B)/size(A \cup B),$$

$$IOU A,B) = size(A \cap B)/size(A),$$

$$IOU A,B) = size(A \cap B)/size(B),$$

$$IOU A,B) = size(A \cap B)/\min(size(A), size(B)) \quad \text{Equation 1}$$

According to an embodiment of the disclosure, the ROI determination module 330 may calculate the size of the first ROI to be larger by a predetermined size or more based on movement of a subject from which a ROI is detected.

According to an embodiment of the disclosure, when detecting a plurality of first ROIs matching one first ROI, the ROI determination module 330 may determine a first ROI with a largest IOU value among the plurality of first ROIs or a first ROI with a smallest center distance to the one first ROI to be a first ROI matching the one first ROI.

According to an embodiment of the disclosure, the ROI determination module 330 may perform the region matching function by using a Euclidean distance from which the degree of similarity may be obtained as illustrated in Equation 2. When the Euclidean distance between the center (A RECT center) of a first ROI (A ROI) detected in the first image and the center (B RECT center) of a first ROI (B ROI) detected in the second image is less than a value obtained by multiplying the width (BodyWidth) of a second ROI detected by the second detector (e.g., a body detector) by a predetermined ratio or a value obtained by multiplying the height (BodyHeight) of the second ROI detected by the second detector (e.g., a body detector) by a predetermined ratio, the ROI determination module 330 may determine that the first ROI (ROI A) detected in the first image and the first ROI (ROI B) detected in the second image are the same first ROI.

$$\text{EuclideanDist}(A \text{ RECT Center}, B \text{ RECT Center})$$
$$< \text{BodyWidth} * \text{ratio}$$

$$\text{EuclideanList}(A \text{ RECT Center}, B \text{ RECT Center})$$
$$< \text{BodyHeight} * \text{ratio} \quad \text{Equation 2}$$

According to various embodiments of the disclosure, the ROI determination module 330 (e.g., the processor 220 of FIG. 2) may use the estimation function to estimate a first ROI (e.g., a face region) from a second ROI (e.g., a body region), estimate a second ROI (e.g., a body region) from a first ROI (e.g., a face region), or estimate a first ROI (e.g., a face region) from a third ROI (e.g., a face feature region).

According to an embodiment of the disclosure, the ROI determination module 330 may estimate a first ROI based on a second ROI detected by using the second detector. Referring to FIG. 4A, the ROI determination module 330 may estimate a first ROI 413 from a second ROI 411 by an estimation function of calculating the size W*R1 and H*R2 of the first ROI (e.g., a face region) by multiplying the size W (width) and H (height) of the second ROI 411 (e.g., a body region) by predetermined ratios R1 and R2, and calculating the position of the first ROI (e.g., a face region), height*R4 from left and width*R3 from bottom, by multiplying the size W and H of the second RO 411 (e.g., a body region) by predetermined ratios R3 and R4.

When body skeleton information is stored in a memory (e.g., the memory 230 of FIG. 2) of the electronic device, the ROI determination module 330 may calculate the size and position of a first ROI (e.g., a face region) by using information about the positions of skeletons. The ROI determination module 330 may estimate the size and position of the face region by using the coordinates of the left and right shoulder skeletons based on the body skeleton information. The ROI determination module 330 may estimate the size (e.g., a1*R6(width) and a1*R5(height)) of the first ROI (e.g., a face region) 413 by multiplying the Euclidean distance (EuclideanDistance) between the coordinates of the left and right shoulders by specific ratios (e.g., Ratio5 and Ratio6), and determine the position of the first ROI (e.g., a face region) which is estimated such that the center coordinates a1/2 of the left and right shoulders are identical to the center coordinates of the estimated first ROI (e.g., a face region) 413, and the first ROI (e.g., a face region) is located on the shoulders.

According to an embodiment of the disclosure, the ROI determination module 330 may estimate a second ROI (e.g., a body region) based on the first ROI 413 (e.g., a face region) detected by using the first detector. Referring to FIG. 5, the ROI determination module 330 may estimate the second ROI (e.g., a body region) by an estimation function of calculating the size W*R7 and H*R8 of the second ROI (e.g., a body region) by applying predetermined ratios R7 and R8 to the size W and H of the first ROI 413 (e.g., a face region) and matching the top side TOP of the second ROI 411 (e.g., a body region) to the top side TOP of the first ROI (e.g., a face region) and the center of the second ROI 411 (e.g., a body region) to the center of the first ROI (e.g., a face region).

According to an embodiment of the disclosure, the ROI determination module 330 may estimate a first ROI (e.g., a face region) based on a third ROI (e.g., face feature information) detected by using the third detector. The ROI determination module 330 may estimate the first ROI (e.g., a face region) based on relative positions and sizes of eyes, a nose, and a mouth based on information about the eyes, the nose, and the mouth detected in the third ROI (e.g., face feature information) in a similar manner to the method of estimating a first ROI (e.g., a face region) based on a second ROI (e.g., a body region) or estimating a second ROI (e.g., a body region) based on a first ROI (e.g., a face region). When detecting both eyes 631 and 633 as third ROIs, the ROI determination module 330 may estimate the size and position of a first ROI (e.g., a face region) 613 by an estimation function of multiplying the distance W between the eyes 631 and 633 and the height H of the eyes 631 and 633 by ratios R', R", and R''', as illustrated in FIG. 6A.

When detecting both of the eyes 631 and 633 and a nose 635 as third ROIs, the ROI determination module 330 may estimate the size and position of the first ROI (e.g., a face region) 613 by an estimation function of multiplying the distance W between the eyes 631 and 633 and the height H of the eyes 631 and 633 from the nose 635 by ratios R', R", and R''', as illustrated in FIG. 6B.

When detecting the nose 635 and a mouth 673 as third ROIs, the ROI determination module 330 may estimate the size and position of the first ROI (e.g., a face region) 613 by an estimation function of multiplying the distance W between the left and right edges of the mouth 637 and the height H of the nose 635 from the mouth 673 by ratios R', R", and R'", as illustrated in FIG. 6C.

When detecting the mouth 673 as a third ROI, the ROI determination module 330 may estimate the size and position of the first ROI (e.g., a face region) 613 by an estimation function of multiplying the distance W between the left and right edges of the mouth 673 and the height H of the mouth 673 by ratios R', R", and R'", as illustrated in FIG. 6D.

The ROI determination module 330 may estimate a first ROI based on a third ROI as illustrated in FIGS. 6A to 6D, and estimate a second ROI based on the first ROI in the method illustrated in FIG. 5A.

According to an embodiment of the disclosure, the ROI determination module 330 may update an estimated ROI size differently according to a predetermined magnification used in the estimation function.

For example, in the case where the first detector for detecting a first ROI (e.g., a face region) is a main detector, for a subject (e.g., a person) having a first ROI (e.g., face region) which is partially covered with a mask and thus is not detected by the first detector, the ROI determination module 330 may detect a second ROI (e.g., a body region) by the second detector as an auxiliary detector. The ROI determination module 330 may estimate only a face region, an upper body region, or an entire body region as a ROI according to the detected second ROI (e.g., a body region) and predetermined ratios (e.g., R1, R2, R3, and R4). Accordingly, when a plurality of subjects (e.g., persons) are displayed on a display (e.g., the display 260 of FIG. 2), all of the plurality of subjects may be displayed cropped under face regions. Alternatively, the face regions of some of the subjects and the upper body regions of other subjects may be displayed together by cropping. Alternatively, the face regions of some of the subjects, the upper body regions of other subjects, and the entire body regions of other more subjects may be displayed together by cropping. For example, the plurality of subjects (e.g., persons) may be displayed on the display by applying different cropping ranges, such as a face region, an upper body region, and a body region to the subjects at a certain ratio used in the estimation function.

For example, when a first ROI (e.g., a face region) is set as a main ROI and partially covered with a mask, the ROI determination module 330 may change the main ROI to an upper body region or a second ROI (e.g., a body region) estimated by the second detector (e.g., a body detector). When changing the first ROI to the upper body region or the second ROI (e.g., a body region) as the main ROI, the ROI determination module 330 may change face region-centered zooming to zooming centered on an upper body region or body region.

According to an embodiment of the disclosure, the ROI determination module 330 may apply a different ROI to each of all subjects included in an image received through the camera module (e.g., the camera module 290 of FIG. 2).

According to various embodiments of the disclosure, the ROI determination module 330 (e.g., the processor 220 of FIG. 2) may determine that at least one first ROI in a predetermined number of consecutive frames received after the first image through the camera module (e.g., the camera module 290 of FIG. 2), which matches at least one first ROI (e.g., N face regions) detected in the first image received through the camera module (e.g., the camera module 290 of FIG. 2) is identical to the at least one first ROI (e.g., N face regions) detected in the first image. Accordingly, a subject (e.g., a person) passing in front of the camera module or a subject (e.g., a person) included in an image received through the camera module only for a short period of time may be prevented from being set as a ROI.

According to an embodiment of the disclosure, the ROI determination module 330 may use all ROIs or only a predetermined number of ROIs among all ROIs by applying different ROIs to a plurality of subjects included in an image received through the camera module.

For example, the ROI determination module 330 may select only a predetermined number of larger ROIs from among all ROIs. The predetermined number of larger ROIs may be selected according to their sizes or their proximity to the center of the image. The ROI determination module 330 may select the predetermined number of ROIs by applying weights to the ROIs according to their distances from the center of the image and their sizes. The ROI determination module 330 may determine a main subject from among a plurality of subjects included in the image based on the selected predetermined number of ROIs and execute zooming and/or panning, with the main subject set as a ROI.

According to various embodiments of the disclosure, when failing to detect a main ROI (e.g., a first ROI) by a main detector (e.g., the first detector) and thus detecting the main ROI (e.g., a first ROI) by using a plurality of auxiliary detectors, the ROI determination module 330 (e.g., the processor 220 of FIG. 2) may change the order of the plurality of auxiliary detectors and add a new auxiliary detector.

According to various embodiments of the disclosure, when detecting the main ROI (e.g., a first ROI) by using the plurality of auxiliary detectors, the ROI determination module 330 (e.g., the processor 220 of FIG. 2) may perform the region matching function after the estimation function or perform the estimation function after the region matching function.

According to an embodiment of the disclosure, when the ROI determination module 330 does not perform the estimation function, the ROI determination module 330 may update previous ROIs to different ROIs detected by using the plurality of auxiliary detectors.

According to various embodiments of the disclosure, the ROI determination module 330 (e.g., the processor 220 of FIG. 2) may detect ROIs for all subjects included in an image received through the camera module (e.g., the camera module 290 of FIG. 2) or only around a set ROI, by using the plurality of detectors.

According to various embodiments of the disclosure, the target region determination module 350 (e.g., the processor 220 of FIG. 2) may change a target region for displaying at least one first ROI based on a first ROI change.

According to an embodiment of the disclosure, while displaying a first preview image with a first target region for displaying at least one first ROI detected in the first image, the target region determination module 350 may calculate a new second target region based on a change of at least one first ROI detected in the second image received after the first image.

According to an embodiment of the disclosure, when at least one of a first condition that the number of at least one first ROI is changed due to addition of a new subject or disappearance of an existing subject in an image, a second condition that the positions of some or all of at least one first ROI are changed due to movement of some or all of subjects (e.g., some or all of at least one first ROI move out of a current target region (e.g., a first target region), or a third condition that a union region Union RECT including at least one first ROI is changed (e.g., the size of the union region becomes smaller than a predetermined ratio Th1 of the current target region (e.g., the first target region) Target RECT and thus satisfies the following Equation 3), the target region determination module 350 may update the first target region for displaying at least one first ROI to the new second target region.

Size(Union_RECT(A-ROI RECTs)/Size(Target RECT)<Th1.       Equation 3

Union_RECT: Minimum region including at least one ROI (N ROI RECTs)

For example, when a first ROI for a new subject that may be tracked in an image (e.g., a second image) is added according to the first condition, the target region determination module 350 may update the first target region to a second target region. When the target region determination module 350 fails to detect a first ROI for a subject that has been previously tracked in an image (e.g., the second image) according to the first condition, the target region determination module 350 may update the first target region to a second target region to display only first ROIs of the remaining subjects.

For example, when a subject to be zoomed and/or panned according to a first ROI setting moves up/down/to the left/to the right and thus get closer the boundary of the first target region according to the second condition, the target region determination module 350 may update the first target region to a second target region to move the target region along with the subject. When determining at least one of subjects will move out of the first target region by monitoring all ROIs configured in an image (e.g., a second image), the target region determination module 350 may update the first target region to a second target region.

For example, when the position of at least one first ROI included in the first target region is changed by a threshold or larger according to the third condition, the target region determination module 350 may update the first target region to a second target region. For example, when subjects displayed as standing on the display (e.g., the display 260 of FIG. 2) are seated or at least one first ROI distributed widely gathers in one region, the target region determination module 350 may update the first target region to a second target region to reduce a blank space in the display and zoom the first ROI larger.

According to an embodiment of the disclosure, when at least one of the first to third conditions is satisfied, the target region determination module 350 may update the first target region (current target region) to a second target region (new target, New Target RECT) by Equation 4 below. The target region determination module 350 may calculate the new target region New Target RECT by adding margins at predetermined ratios to the top, bottom, left, and right sides of a union region Union RECT including at least one first ROI.

New Target RECT=Union_RECT(A-ROI RECTs)+ Margin       Equation 4

According to an embodiment of the disclosure, the target region determination module 350 may determine a new preview region by adjusting the size of the new target region at the same ratio as an image received through the camera module (e.g., the camera module 290 of FIG. 2) and transmit the determined new preview region to the preview region determination module 370. The target region determination module 350 may compare the determined new preview region with the input image. When the size of the new preview region is equal to or greater than the size of the received image or crosses the boundary of the received image, the target region determination module 350 may adjust the size of the new preview region to match the size of the received image.

According to various embodiments of the disclosure, the preview region determination module 370 may provide a new preview image through gradual movement from the previous preview image.

According to an embodiment of the disclosure, when switching a current preview image 711 including a current preview region to a new previous image 715 including a new preview region received from the target region determination module (e.g., 350), the preview region determination module 370 may generate an intermediate preview image 713 including an intermediate preview region to be displayed between the current preview image 711 and the new preview image 715. The preview region determination module 370 may naturally switch the current preview image 711 to the new preview image 715 by sequentially displaying the current preview image 711, the intermediate preview image 713, and the new preview image 715.

According to an embodiment of the disclosure, when a maximum distance for movement at one time is d1 and a ratio for enlargement or reduction at one time is r1, the preview region determination module 370 may generate the intermediate preview image 713 including the intermediate preview region by calculating center coordinate information NextCenter as position information about the intermediate preview region by Equation 5 and calculating size information NextRectSize about the intermediate preview region by Equation 6.

$$NextCenter = \frac{dist \cdot \vec{ab}}{|\vec{ab}|} \quad \text{Equation 5}$$

$\vec{a}$: center coordinate information about the current preview region, and $\vec{b}$: center coordinate information about the new preview region $$dist = \begin{cases} d1, & \text{if } d1 < |\vec{ab}| \\ |\vec{ab}|, & \text{else} \end{cases}$$

$NextRectSize = \text{ratio} \times CurrentRectSize$ $$ratio = \begin{cases} 1+r1, & 1 < 1+r1 < \dfrac{PreviewRectSize}{CurrentRectSize} \\ 1-r1, & \dfrac{PreviewRectSize}{CurrentRectSize} < 1-r1 < 1 \\ \dfrac{PreviewRectSize}{CurrentRectSize}, & \text{else} \end{cases} \quad \text{Equation 6}$$

(CurrentRectSize: the size of the current preview region, and PreviewRectSize: the size of the new preview region)

According to an embodiment of the disclosure, when switching the current preview image 711 including the current preview region to a new preview image including a new preview region, the preview region determination module 370 may adaptively apply the maximum distance d1 for movement at one time and the ratio r1 for enlargement or reduction at one time in order to display the new preview image simultaneously with termination of a movement function and an enlargement or reduction function which are performed independently. The preview region determination module 370 may adjust the number of zoomings (enlargements or reductions) and the number of movements of the preview region, while comparing them with a current required number of zoomings and a current required number of movements.

According to an embodiment of the disclosure, the preview region determination module 370 may adjust the movement amount of the preview region (e.g., the current preview region of the current preview image or the new preview region of the new preview image). When the preview region moves for a distance equal to or larger than a threshold and thus the variation is large, the preview region determination module 370 may apply the maximum distance d1 for movement at one time gradually increasingly. When the preview region moves for a distance less than the threshold and thus the variation is small, the preview region determination module 370 may apply the maximum distance d1 for movement at one time gradually decreasingly.

In the same manner as for the movement amount of the preview region, the preview region determination module 370 may adaptively apply the ratio r1 for enlargement or reduction at one time according to a variation of zooming (enlargement or reduction).

According to an embodiment of the disclosure, the preview region determination module 370 may display the new preview region on the display (e.g., the display 260 of FIG. 2) by adjusting the new preview region to a resolution set in the electronic device.

According to various embodiments of the disclosure, an electronic device (e.g., the electronic device 201) may include a camera module (e.g., the camera module 290 of FIG. 2), a display (e.g., the display 260 of FIG. 2), a plurality of detectors, and at least one processor (e.g., the processor 220 of FIG. 2), and the processor may be configured to detect at least one first ROI in a first image received through the camera module by using a first detector for first ROI detection among the plurality of detectors, detect at least one second ROI in in a second image received through the camera module by using a second detector for second ROI detection among the plurality of detectors when failing in detecting at least one first ROI matching the at least one first ROI detected in the first image in the second image by using the first detector, estimate at least one first ROI based on the at least one second ROI, update the estimated at least one first ROI to at least one first ROI when the at least one first ROI detected in the first image matches the estimated at least one first ROI, and change a position of a preview region including the updated at least one first ROI based on a position of the estimated at least one first ROI matching the at least one first ROI detected in the first image.

According to various embodiments of the disclosure, the at least one processor further may be configured to, upon detection of the at least one first ROI in the second image received through the camera module by using the first detector, determine whether the at least one first ROI detected in the first image matches the at least one first ROI detected in the second image, and when the at least one first ROI detected in the first image matches the at least one first ROI detected in the second image, update the at least one first ROI detected in the second image to at least one first ROI.

According to various embodiments of the disclosure, the at least one processor further may be configured to, when the at least one first ROI detected in the first image does not match the at least one first ROI detected in the second image, update at least one first ROI by adding the at least one first ROI detected in the second image as a new first ROI.

According to various embodiments of the disclosure, the at least one processor further may be configured to, when the at least one first ROI detected in the first image does not match the at least one first ROI estimated based on the second ROI, update at least one first ROI by adding the estimated at least one first ROI, as a new first ROI.

According to various embodiments of the disclosure, the at least one processor further may be configured to, when the at least one first ROI detected in the first image does not match the at least one first ROI estimated based on the second ROI, detect at least one third ROI in the second image by using a third detector for third ROI detection among the plurality of detectors, estimate at least one second ROI based on the at least one third ROI, estimate at least one first ROI based on the estimated at least one second ROI, and when the at least one first ROI detected in the first image matches the estimated at least one first ROI, update the estimated at least one first ROI to at least one first ROI.

According to various embodiments of the disclosure, the at least one processor further may be configured to calculate a size of the first ROI based on a size of the second ROI and a predetermined ratio, calculate a position of the first ROI based on a position of the second ROI and a predetermined ratio, and estimate the first ROI from the second ROI based on the calculated size and position of the first ROI.

According to various embodiments of the disclosure, the at least one processor further is configured to, when identifying that the first ROI is set from among a plurality of ROIs, determine the first detector for first ROI detection as a main detector.

According to various embodiments of the disclosure, the at least one processor further may be configured to determine, as an auxiliary detector, at least one detector except for the first detector determined as the main detector among the plurality of detectors, and detect the first ROI by using the at least one detector determined as the auxiliary detector in a set order.

According to various embodiments of the disclosure, when the plurality of detectors are determined as main detectors, the at least one processor further may be configured to detect at least one first ROI matching the at least one first ROI detected in the first image in the second image received through the camera module by using the plurality of detectors simultaneously.

According to various embodiments of the disclosure, when the at least one first ROI detected in the first image matches the at least one first ROI detected by using the plurality of detectors, the at least one processor further may be configured to update the at least one first ROI detected by using the plurality of detectors to at least one first ROI.

Figure 8:
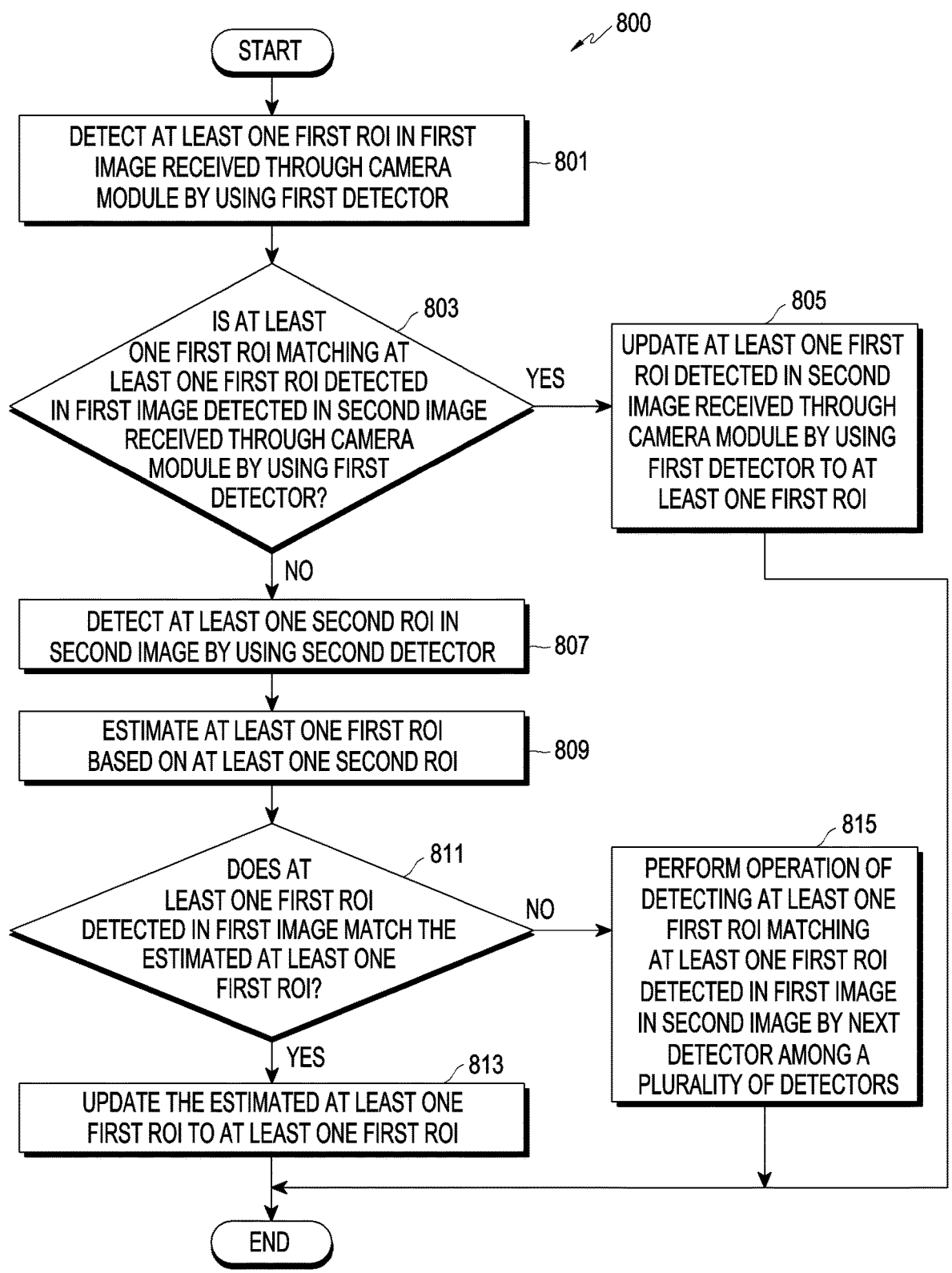
FIG. 8 is a flowchart illustrating an operation of detecting a ROI during image capturing in an electronic device according to an embodiment of the disclosure.

FIG. 8 is a flowchart 800 illustrating an operation of detecting a ROI during image capturing in an electronic device according to an embodiment of the disclosure.

Referring to FIG. 8, an operation of detecting a ROI may include operations 801 to 815, and may be understood as performed by a processor (e.g., the processor 120 of FIG. 1 or the processor 220 of FIG. 2) of the electronic device (e.g., the electronic device 101 of FIG. 1 or the electronic device 201 of FIG. 2). According to an embodiment of the disclosure, at least one of operations 801 to 815 may be omitted, the order of some operations may be changed, or another operation may be added.

In operation 801, the electronic device (e.g., the electronic device 101 of FIG. 1 or the electronic device 201 of FIG. 2) may detect at least one first ROI in a first image received through a camera module (e.g., the camera module 290) by a first detector.

According to an embodiment of the disclosure, the electronic device may detect at least one first ROI in a first image received through the camera module by using a first detector (e.g., a face detector) for detecting a first ROI (e.g., a face region) among a plurality of detectors, and update the detected at least one first ROI to at least one first ROI. The first ROI (e.g., a face region) may be a ROI set from among a plurality of ROIs.

According to an embodiment of the disclosure, the plurality of detectors may include ROI detectors for detecting different ROIs. For example, the plurality of detectors may include a face detector for detecting a face, a body detector for detecting a body, a face attribute detector for detecting a face feature, and may further include other feature detectors. Each of the plurality of detectors may detect information about the coordinates (e.g., left coordinate, right coordinate, top coordinate, and bottom coordinate) of a ROI among a plurality of ROIs.

In operation 803, the electronic device (e.g., the electronic device 101 of FIG. 1 or the electronic device 201 of FIG. 2) may identify whether at least one first ROI matching the at least one first ROI detected in the first image has been detected in a second image received through the camera module.

Upon detection of at least one first ROI matching the at least one first ROI detected in the first image in the second image received through the camera module by using the first detector in operation 803, the electronic device may update the at least one first ROI detected in the second image received through the camera module by using the first detector, to at least one first ROI.

According to an embodiment of the disclosure, the electronic device may change the position of a preview region including the updated at least one first ROI based on the position of the estimated at least one first ROI.

According to an embodiment of the disclosure, when at least one of a first condition that the number of at least one first ROI is changed, a second condition that the positions of some or all of the at least one first ROI are changed, or a third condition that the size of a union region of at least one first ROI is changed is satisfied, the electronic device may update a target region for displaying the at least one first ROI. The electronic device may update the target region by adding margins at predetermined ratios to the top, bottom, left, and right sides of the union region including the at least one first ROI. The electronic device may calculate a new preview region based on the updated target region. The electronic device may determine the position and size of an intermediate preview region based on coordinate information about a current preview region, coordinate information about the new preview region, a set maximum distance for movement at one time, and a set ratio for enlargement or reduction at one time. The electronic device may sequentially display a current preview image including the current preview region, an intermediate preview image including an intermediate preview region, and a new preview image including the new preview region.

When the electronic device fails to detect at least one first ROI matching the at least one first ROI detected in the first image in a second image received through the camera module by using the first detector in operation 803, the electronic device may detect at least one second ROI from the second image by using the second detector.

According to an embodiment of the disclosure, when the electronic device fails to detect a first ROI (e.g., a face region) in the second image received after the first image through the camera module by using the first detector, the electronic device may determine that at least one first ROI matching the at least one first ROI detected in the first image has not been detected in the second image.

According to an embodiment of the disclosure, the electronic device may detect a first ROI (e.g., a face region) in the second image received after the first image through the camera module. When determining that the at least one first ROI detected in the second image does not match the at least one first ROI detected in the first image by the region matching function based on Equation 1 and Equation 2, the electronic device may determine that at least one first ROI matching the at least one first ROI detected in the first image has not been detected in the second image.

According to an embodiment of the disclosure, the electronic device may update at least one first ROI by adding, as a new first ROI, the at least one first ROI detected in the second image, which has been determined as not matching the at least one first ROI detected in the first image.

According to an embodiment of the disclosure, the electronic device may detect at least one second ROI in the second image by using, as an auxiliary detector, the second detector (e.g., a body detector) for detecting a second ROI (e.g., a body region) among the plurality of detectors.

In operation 809, the electronic device (e.g., the electronic device 101 of FIG. 1 or the electronic device 201 of FIG. 2) may estimate at least one first ROI (e.g., a face region) based on the at least one second ROI (e.g., a body region).

According to an embodiment of the disclosure, the electronic device may estimate at least one first ROI (e.g., a face region) from the at least one second ROI (e.g., a body region) by the estimation function based on FIGS. 4A and 4B.

In operation 811, the electronic device (e.g., the electronic device 101 of FIG. 1 or the electronic device 201 of FIG. 2) may identify whether the estimated at least one first ROI matches the at least one first ROI detected in the first image.

When the electronic device identifies that the estimated at least one first ROI matches the at least one first ROI detected in the first image in operation 811, the electronic device may update the estimated at least one first ROI to at least one first ROI in operation 813.

According to an embodiment of the disclosure, when identifying that the estimated at least one ROI matches the at least one first ROI detected in the first image by the region matching function based on Equation 1 and Equation 2, the electronic device may update the estimated at least one first ROI to at least one first ROI.

According to an embodiment of the disclosure, when identifying that the estimated at least one ROI does not match the at least one first ROI detected in the first image by the region matching function, the electronic device may update at least one first ROI by adding the estimated at least one first ROI as at least one new first ROI.

According to an embodiment of the disclosure, when at least one of a first condition that the number of at least one first ROI is changed, a second condition that the positions of some or all of at least one first ROI are changed, or a third condition that the size of a union region of at least one first ROI is changed is satisfied, the electronic device may update a target region for displaying the at least one first ROI. The electronic device may update the target region by adding margins at predetermined ratios to the top, bottom, left, and right sides of the union region including the at least one first ROI. The electronic device may calculate a new preview region based on the updated target region. The electronic device may determine the position and size of an intermediate preview region based on coordinate information about a current preview region, coordinate information about the new preview region, a set maximum distance for movement at one time, and a set ratio for enlargement or reduction at one time. The electronic device may sequentially display a current preview image including the current preview region, an intermediate preview image including the intermediate preview region, and a new preview image including the new preview region.

According to an embodiment of the disclosure, when identifying that the estimated at least one ROI does not match the at least one first ROI detected in the first image by the region matching function in operation 811, the electronic device may perform an operation of detecting at least one first ROI matching the at least one first ROI detected in the first image in a second image in operation 815.

Figure 9A:
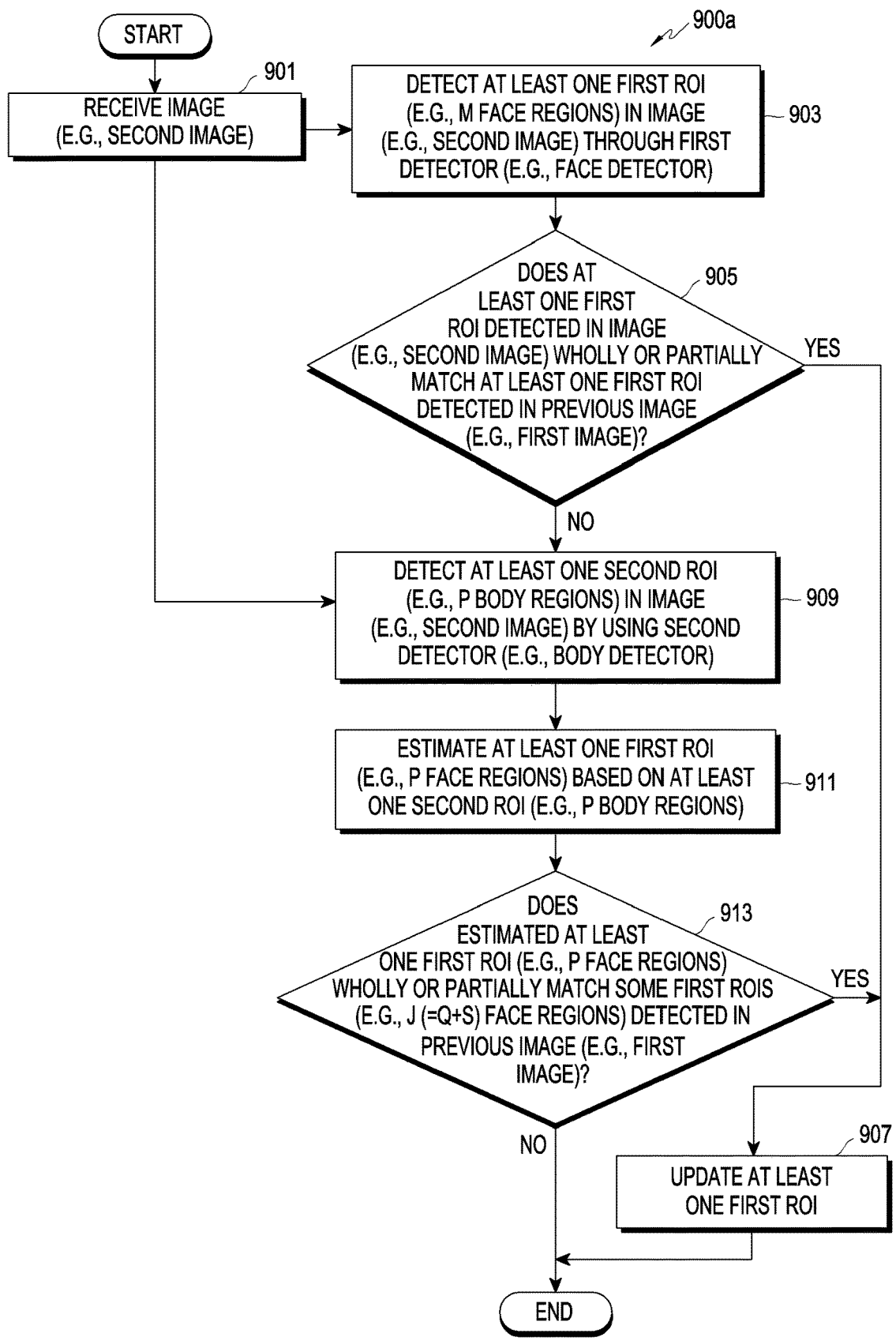
FIGS. 9A and 9B are flowcharts illustrating an operation of detecting a ROI during image capturing in an electronic device according to various embodiments of the disclosure.
Figure 9B:
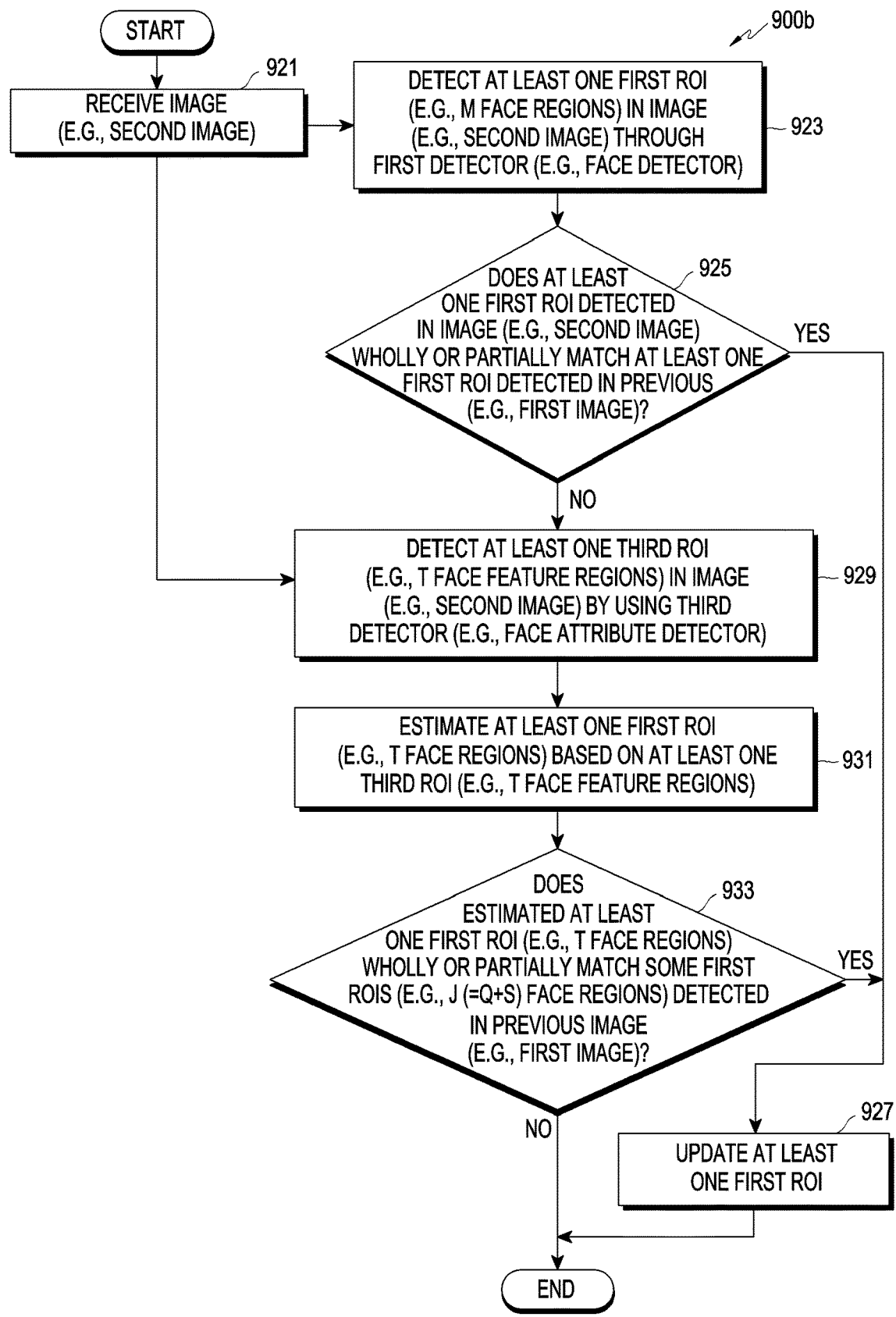

FIGS. 9A and 9B are flowcharts 900a and 900b illustrating an operation of detecting a ROI during image capturing in an electronic device according to various embodiments of the disclosure.

Referring to FIGS. 9A and 9B, an operation of detecting a ROI may include operations 901 to 913 of FIG. 9A and operations 921 to 933 of FIG. 9B, and may be understood as performed by a processor (e.g., the processor 120 of FIG. 1 or the processor 220 of FIG. 2) in the electronic device (e.g., the electronic device 101 of FIG. 1 or the electronic device 201 of FIG. 2). According to an embodiment of the disclosure, at least one of operations 901 to 913 of FIG. 9A and operations 921 to 933 of FIG. 9B may be omitted, the order of some operations may be changed, or another operation may be added.

When the first detector (e.g., a face detector) is set as a main detector, an operation of detecting a first ROI (e.g., a face region) will be described below.

Referring to FIG. 9A, in operation 901, the electronic device (e.g., the electronic device 101 of FIG. 1 or the electronic device 201 of FIG. 2) may receive an image (e.g., a second image).

According to an embodiment of the disclosure, the electronic device may receive the image (e.g., a second image) through a camera module (e.g., the camera module 290 of FIG. 2) in operation 901.

In operation 903, the electronic device (e.g., the electronic device 101 of FIG. 1 or the electronic device 201 of FIG. 2) may detect at least one first ROI (e.g., M face regions) in the image (e.g., a second image) through a first detector (e.g., a face detector).

According to an embodiment of the disclosure, the electronic device may detect the at least one first ROI (e.g., M face regions) in the image (e.g., a second image) by using the first detector (e.g., a face detector) for detecting a first ROI among a plurality of detectors.

In operation 905, the electronic device (e.g., the electronic device 101 of FIG. 1 or the electronic device 201 of FIG. 2) may determine whether the at least one first ROI detected in the image (e.g., a second image) wholly or partially matches at least one first ROI detected in a previous image (e.g., a first image).

According to an embodiment of the disclosure, the electronic device (e.g., the electronic device 101 of FIG. 1 or the electronic device 201 of FIG. 2) may determine whether the at least one first ROI (e.g., M face regions) detected in the image (e.g., a second image) wholly or partially matches the at least one first ROI (e.g., N face regions) detected in the previous image (e.g., a first image) by the region matching function based on Equation 1 to Equation 2.

When the at least one first ROI (e.g., M face regions) detected in the image (e.g., a second image) wholly matches the at least one first ROI (e.g., N face regions) detected in the previous image (e.g., a first image) (e.g., all of the first ROIs are the face of the same subject) in operation 905, the electronic device may update at least one first ROI with the at least one first ROI (e.g., M (=K+L) face regions) detected in the image (e.g., the second image).

When a part (e.g., K face regions) of the at least one first ROI (e.g., M (=K+L) face regions) detected in the image (e.g., second image) match a part (e.g., K face regions) of the at least one first ROI (e.g., N (=K+J) face regions) detected in the previous image (e.g., a first image) (e.g., some first ROIs are the face of the same subject) in operation 905, the electronic device may update at least one first ROI with the part (K face regions) of the at least one first ROI (e.g., M (=K+L) face regions) detected in the image (e.g., a second image) in operation 907.

The electronic device (e.g., the electronic device 101 of FIG. 1 or the electronic device 201 of FIG. 2) may determine, as a new first ROIs (e.g., the face region of a new subject), a part (e.g., L face regions) of the at least one first ROI (e.g., M (=K+L) face regions) detected in the image (e.g., a second image), which do not match the at least one first ROI (e.g., N (=K+J) face regions) detected in the previous image (e.g., a first image) in operation 905, and update at least one first ROI by adding the new first ROI (e.g., L face region) in operation 907.

When identifying the presence of a part (e.g., J face regions) of the at least one first ROI (e.g., N (=K+J) face regions) detected from the previous message (e.g., first image), which have not been detected by the first detector, in operation 905, the electronic device (e.g., the electronic device 101 of FIG. 1 or the electronic device 201 of FIG. 2) may perform operation 909.

In operation 909, the electronic device (e.g., the electronic device 101 of FIG. 1 or the electronic device 201 of FIG. 2) may detect at least one second ROI (e.g., P body regions) in the image (e.g., a second image) by using the second detector (e.g., body detector).

According to an embodiment of the disclosure, the electronic device may detect the at least one second ROI (e.g., P body regions) in the image (e.g., a second image) by using the second detector (e.g., a body detector) for detecting a second ROI among the plurality of detectors.

In operation 911, the electronic device (e.g., the electronic device 101 of FIG. 1 or the electronic device 201 of FIG. 2) may estimate at least one first ROI (e.g., P face regions) based on the at least one second ROI (e.g., P body regions).

According to an embodiment of the disclosure, the electronic device may estimate the at least one first ROI (e.g., P face regions) from the at least one second ROI (e.g., P body regions) by the estimation function based on FIGS. 4A and 4B.

In operation 913, the electronic device (e.g., the electronic device 101 of FIG. 1 or the electronic device 201 of FIG. 2) may determine whether the estimated at least one first ROI (e.g., P face regions) wholly or partially matches the part (e.g., J (=Q+S) face regions) of the at least one first ROI detected in the previous image (e.g., first image).

According to an embodiment of the disclosure, the electronic device may determine whether the estimated at least one first ROI (e.g., P face regions) wholly or partially matches the part (e.g., J (=Q+S) face regions) of the at least one first ROI detected in the previous image (e.g., a first image) by the region matching function based on Equation 1 or Equation 2.

When the estimated at least one first ROI (e.g., P face regions) wholly matches the part (e.g., J face regions) of the at least one first ROI detected in the previous image (e.g., a first image) in operation 913, the electronic device may update at least one first ROI with the estimated at least one first ROI (e.g., P face regions) in operation 907.

When a part (Q face regions) of the estimated at least one first ROI (P (=Q+S) face regions) match a part (Q face regions) of the part (e.g., J (=Q+S) face regions) of the at least one first ROI detected in the previous image (e.g., a first image) in operation 913, the electronic device may update at least one first ROI with the part (e.g., Q face regions) of the estimated at least one first ROI (e.g., P (=Q+S) face regions) in operation 907.

In operation 913, the electronic device (e.g., the electronic device 101 of FIG. 1 or the electronic device 201 of FIG. 2) may determine, as a new first ROI (e.g., the face region of a new subject), a part (e.g., R face regions) of the estimated at least one first ROI (P (=Q+R) face regions), which do not match the part (e.g., J (=Q+S) face regions) of the at least one first ROI detected in the first image. The electronic device may update at least one first ROI by adding the new first ROI (e.g., R face regions) in operation 907.

Referring to FIG. 9B, in operation 921, the electronic device (e.g., the electronic device 101 of FIG. 1 or the electronic device 201 of FIG. 2) may receive an image (e.g., a second image).

According to an embodiment of the disclosure, the electronic device may receive then image (e.g., a second image) through the camera module (e.g., the camera module 290 of FIG. 2).

In operation 923, the electronic device (e.g., the electronic device 101 of FIG. 1 or the electronic device 201 of FIG. 2) may detect at least one first ROI (e.g., M face regions) in the image (e.g., a second image) through the first detector (e.g., a face detector).

According to an embodiment of the disclosure, the electronic device may detect the at least one first ROI (e.g., M face regions) in the image (e.g., a second image) by using the first detector (e.g., a face detector) for detecting a first ROI among the plurality of detectors.

In operation 925, the electronic device (e.g., the electronic device 101 of FIG. 1 or the electronic device 201 of FIG. 2) may determine whether the at least one first ROI detected in the image (e.g., a second image) wholly or partially matches at least one first ROI detected in a previous image (e.g., a first image).

According to an embodiment of the disclosure, the electronic device (e.g., the electronic device 101 of FIG. 1 or the electronic device 201 of FIG. 2) may determine whether the at least one first ROI (e.g., M face regions) detected in the image (e.g., a second image) wholly or partially matches the at least one first ROI (e.g., N face regions) detected in the previous image (e.g., a first image) by the region matching function based on Equation 1 and Equation 2.

When the at least one first ROI (e.g., M face regions) detected in the image (e.g., a second image) wholly matches the at least one first ROI (e.g., N face regions) detected in the previous image (e.g., a first image) (e.g., all the first ROIs are the face of the same subject) in operation 925, the electronic device may update at least one first ROI with the at least one first ROI (e.g., M (=K+L) face regions) detected in the image (e.g., a second image) in operation 927.

When a part (e.g., K face regions) of the at least one first ROI (e.g., M (=K+L) face regions) detected in the image (e.g., a second image) match a part (e.g., K face regions) of the at least one first ROI (e.g., N (=K+J) face regions) detected in the previous image (e.g., a first image) (e.g., some first ROIs are the face of the same subject) in operation 925, the electronic device may update at least one first ROI with the part (K face regions) of the at least one first ROI (e.g., M (=K+L) face regions) detected in the image (e.g., a second image) in operation 927.

The electronic device (e.g., the electronic device 101 of FIG. 1 or the electronic device 201 of FIG. 2) may determine, as a new first ROI (e.g., the face region of a new subject), a part (e.g., L face regions) of the at least one first ROI (e.g., M (=K+L) face regions) detected in the image (e.g., a second image), which do not match the at least one first ROI (e.g., N (=K+J) face regions) detected in the previous image (e.g., a first image) in operation 925, and update at least one first ROI by adding the new first ROI (e.g., L face regions) in operation 927.

When identifying the presence of a part (e.g., J face regions) of the at least one first ROI (e.g., N (=K+J) face regions) detected from the previous message (e.g., first image), which have not been detected by the first detector in operation 925, the electronic device (e.g., the electronic device 101 of FIG. 1 or the electronic device 201 of FIG. 2) may perform operation 929.

In operation 929, the electronic device (e.g., the electronic device 101 of FIG. 1 or the electronic device 201 of FIG. 2) may detect at least one third ROI (e.g., T face feature regions) in the image (e.g., a second image) by using the third detector (e.g., face attribute detector).

According to an embodiment of the disclosure, the electronic device may detect at least one third ROI (e.g., T face attribute regions) in the image (e.g., a second image) by using the third detector (e.g., a face attribute detector) for detecting a third ROI among the plurality of detectors.

In operation 931, the electronic device (e.g., the electronic device 101 of FIG. 1 or the electronic device 201 of FIG. 2) may estimate at least one first ROI (e.g., T face regions) based on the at least one third ROI (e.g., T face feature regions).

According to an embodiment of the disclosure, the electronic device may estimate the at least one first ROI (e.g., T face regions) from the at least one third ROI (e.g., T face attribute regions) by the estimation function based on FIGS. 4A and 4B.

In operation 933, the electronic device (e.g., the electronic device 101 of FIG. 1 or the electronic device 201 of FIG. 2) may determine whether the estimated at least one first ROI (e.g., T face regions) wholly or partially matches the at least one first ROI (e.g., N (=K+J) face regions) detected in the previous image (e.g., a first image).

According to an embodiment of the disclosure, the electronic device may determine whether the estimated at least one first ROI (e.g., T face regions) wholly or partially matches the part (e.g., J face regions) of the at least one first ROI detected in the previous image (e.g., a first image) by the region matching function based on Equation 1 or Equation 2.

When the estimated at least one first ROI (e.g., T face regions) wholly matches the part (e.g., J face regions) of the at least one first ROI detected in the previous image (e.g., a first image) in operation 933, the electronic device may update at least one first ROI with the estimated at least one first ROI (e.g., T face regions) in operation 927.

When a part (e.g., T face regions) of the estimated at least one first ROI (T (=U+V) face regions) match the part (e.g., J (=Q+S) face regions) of the at least one first ROI detected in the previous image (e.g., a first image) in operation 933, the electronic device may update at least one first ROI with the part (e.g., U face regions) of the estimated at least one first ROI (e.g., T (=U+V) face regions) in operation 927.

In operation 933, the electronic device (e.g., the electronic device 101 of FIG. 1 or the electronic device 201 of FIG. 2) may determine, as a new first ROI (e.g., the face region of a new subject), a part (e.g., V face regions) of the estimated at least one first ROI (e.g., T (=U+V) face regions), which do not match the part (e.g., J face regions) of the at least one first ROI detected in the first image. The electronic device may update at least one first ROI by adding the new first ROI (e.g., V face regions) in operation 927.

Figure 10:
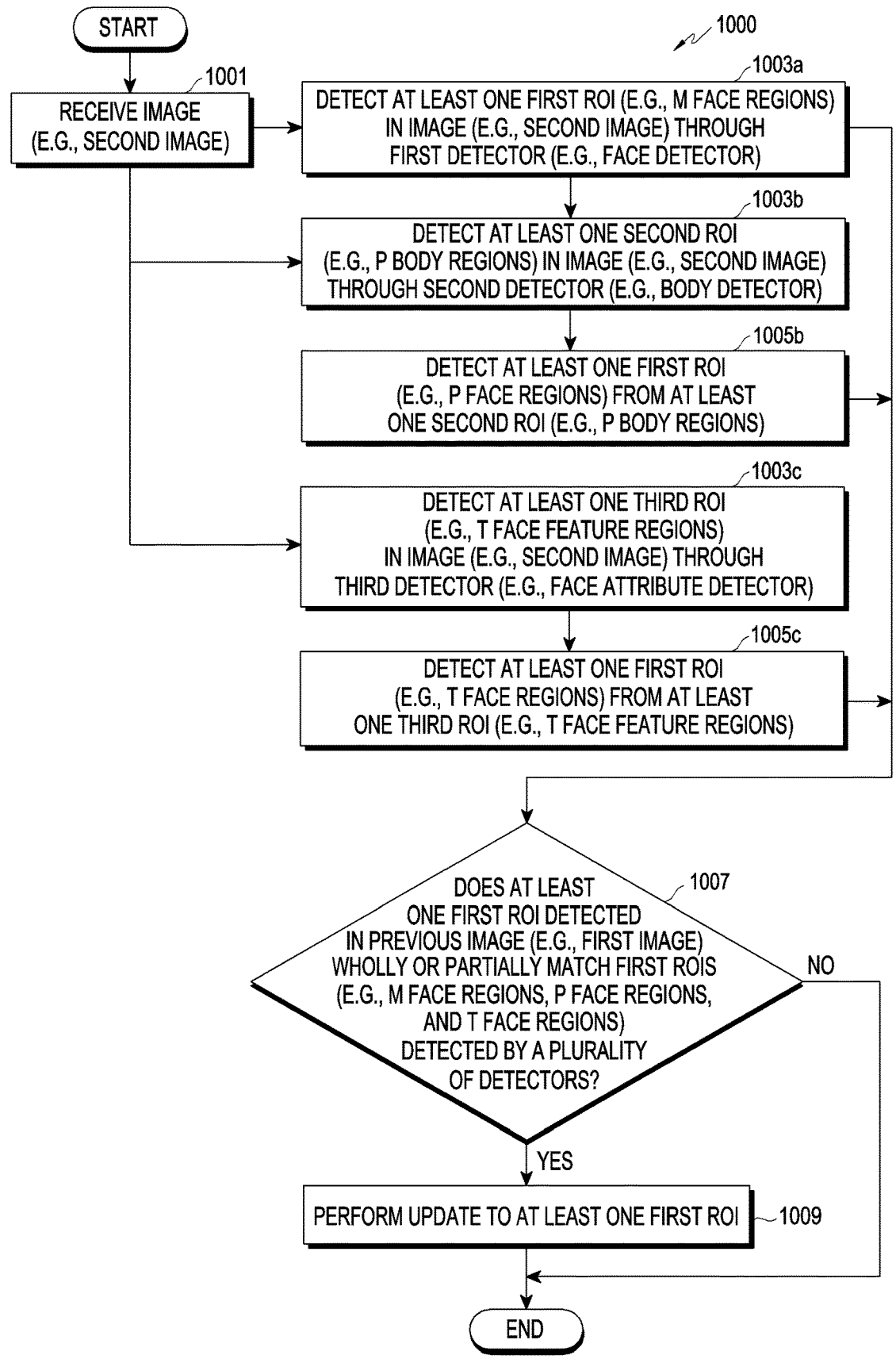
FIG. 10 is a flowchart illustrating an operation of detecting a ROI during image capturing in an electronic device according to an embodiment of the disclosure.

FIG. 10 is a flowchart 1000 illustrating an operation of detecting a ROI during image capturing in an electronic device according to an embodiment of the disclosure.

Referring to FIG. 10, an ROI detection operation may include operations 1001 to 1009, and may be understood as performed by a processor (e.g., the processor 120 of FIG. 1 or the processor 220 of FIG. 2) of the electronic device (e.g., the electronic device 101 of FIG. 1 or the electronic device 201 of FIG. 2). According to an embodiment of the disclosure, at least one of operations 1001 to 1009 may be omitted, the order of some operations may be changed, or another operation may be added.

In operation 1001, the electronic device (e.g., the electronic device 101 of FIG. 1 or the electronic device 201 of FIG. 2) may receive an image (e.g., a second image).

According to an embodiment of the disclosure, the electronic device may receive the image (e.g., a second image) through a camera module (e.g., the camera module 290 of FIG. 2).

In operations 1003a, 1003b, and 1003c, the electronic device (e.g., the electronic device 101 of FIG. 1 or the electronic device 201 of FIG. 2) may detect a first ROI in the image (e.g., a second image) by simultaneously using a plurality of detectors.

In operation 1003a, the electronic device may detect at least one first ROI (e.g., M face regions) in the image (e.g., a second image) through a first detector (e.g., a face detector) for detecting a first ROI.

In operation 1003b, the electronic device may detect at least one second ROI (e.g., P body regions) in the image (e.g., a second image) through a second detector (e.g., a body detector) for detecting a second ROI. In operation 1005b, the electronic device may detect at least one first ROI (e.g., P face regions) from the at least one second ROI (e.g., P body regions) by an estimation function.

In operation 1003c, the electronic device may detect at least one third ROI (e.g., T face feature regions) in the image (e.g., a second image) through a third detector (e.g., a face attribute detector) for detecting a third ROI. In operation 1005c, the electronic device may detect at least one first ROI (e.g., T face regions) from the at least one third ROI (e.g., T face feature regions) by the estimation function.

In operation 1007, the electronic device (e.g., the electronic device 101 of FIG. 1 or the electronic device 201 of FIG. 2) may determine whether at least one first ROI (e.g., N face regions) detected in a previous image (e.g., the first image) wholly or partially matches the first ROIs (e.g., M face regions, P face regions, and T face regions) detected by using the plurality of detectors.

According to an embodiment of the disclosure, the electronic device may determine whether the at least one first ROI (e.g., N face regions) detected in the previous image (e.g., a first image) wholly or partially matches the at least one first ROI (e.g., M face regions) detected by the first detector by a region matching function.

According to an embodiment of the disclosure, the electronic device may determine whether the at least one first ROI (e.g., N face regions) detected in the previous image (e.g., a first image) wholly or partially matches the at least one first ROI (e.g., P face regions) detected by the second detector by the region matching function.

According to an embodiment of the disclosure, the electronic device may determine whether the at least one first ROI (e.g., N face regions) detected in the previous image (e.g., a first image) wholly or partially matches the at least one first ROI (e.g., T face regions) detected by the third detector by the region matching function.

When the electronic device (e.g., the electronic device 101 of FIG. 1 or the electronic device 201 of FIG. 2) determines at least one first ROI corresponding to some or all of the first ROIs (e.g., M face regions, P face regions, and T face regions) detected by the plurality of detectors, which match the at least one first ROI (e.g., N face regions) detected in the previous image (e.g., a first image) in operation 1007, the electronic device may update the determined at least one first ROI (e.g., M face regions, P face regions, and T face regions) to at least one first ROI in operation 1009.

According to various embodiments of the disclosure, a method for capturing an image in an electronic device may include detecting at least one first ROI in a first image received through a camera module by using a first detector for first ROI detection among a plurality of detectors, detecting at least one second ROI in a second image received through the camera module by using a second detector for second ROI detection among the plurality of detectors when failing in detecting at least one first ROI matching the at least one first ROI detected in the first image in the second image by using the first detector, estimating at least one first ROI based on the at least one second ROI, updating the estimated at least one first ROI to at least one first ROI when the at least one first ROI detected in the first image matches the estimated at least one first ROI, and changing a position of a preview region including the updated at least one first ROI based on a position of the estimated at least one first ROI matching the at least one first ROI detected in the first image.

According to various embodiments of the disclosure, the method may further include, upon detection of the at least one first ROI in the second image received through the camera module by using the first detector, determining whether the at least one first ROI detected in the first image matches the at least one first ROI detected in the second image, and when the at least one first ROI detected in the first image matches the at least one first ROI detected in the second image, updating the at least one first ROI detected in the second image to at least one first ROI.

According to various embodiments of the disclosure, the method may further include, when the at least one first ROI detected in the first image does not match the at least one first ROI detected in the second image, updating at least one first ROI by adding the at least one first ROI detected in the second image, as a new first ROI.

According to various embodiments of the disclosure, the method may further include, when the at least one first ROI detected in the first image does not match the at least one first ROI estimated based on the second ROI, updating at least one first ROI by adding the estimated at least one first ROI as a new first ROI.

According to various embodiments of the disclosure, the method may further include, when the at least one first ROI detected in the first image does not match the at least one first ROI estimated based on the second ROI, detecting at least one third ROI in the second image by using a third detector for third ROI detection among the plurality of detectors, estimating at least one second ROI based on the at least one third ROI, estimating at least one first ROI based on the estimated at least one second ROI; and when the at least one first ROI detected in the first image matches the estimated at least one first ROI, updating the estimated at least one first ROI to at least one first ROI.

According to various embodiments of the disclosure, the estimation of the first ROI may include calculating a size of the first ROI based on a size of the second ROI and a predetermined ratio, calculating a position of the first ROI based on a position of the second ROI and a predetermined ratio, and estimating the first ROI from the second ROI based on the calculated size and position of the first ROI.

According to various embodiments of the disclosure, the method may further include, when it is identified that the first ROI is set from among a plurality of ROIs, determining the first detector for first ROI detection as a main detector.

According to various embodiments of the disclosure, the method may further include determining, as an auxiliary detector, at least one detector except for the first detector determined as the main detector among the plurality of detectors, and identifying an order of applying the at least one detector determined as the auxiliary detector for detecting the first ROI based on an order set when the first detector is determined as the main detector.

According to various embodiments of the disclosure, the method may further include, when the plurality of detectors are determined as main detectors, detecting at least one first ROI matching the at least one first ROI detected in the first image in the second image received through the camera module by using the plurality of detectors simultaneously.

According to various embodiments of the disclosure, the method may further include, when the at least one first ROI detected in the first image matches the at least one first ROI detected by using the plurality of detectors, updating the at least one first ROI detected by using the plurality of detectors to at least one first ROI.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a camera module;
a display;
a plurality of detectors;
at least one processor; and
memory storing instructions that, when executed by the at least one processor, cause the electronic device to:
determine a first detector among the plurality of detectors as a main detector,
determine at least one detector, except for the first detector, among the plurality of detectors as an auxiliary detector,
identify an order of the plurality of detectors including the first detector and the at least one detector,
detect at least one first region of interest (ROI) in a first image received through the camera module by using a first detector for first ROI detection among the plurality of detectors,
when failing to detect at least one first ROI matching the at least one first ROI detected in the first image in a second image received through the camera module by using the first detector, identify a second detector for second ROI detection among the at least one detector determined as the auxiliary detector, and detect at least one second ROI in the second image by using the second detector instead of the first detector, and estimate at least one first ROI based on the at least one second ROI,
when the at least one first ROI detected in the first image matches the estimated at least one first ROI, update the estimated at least one first ROI to at least one first ROI, and
change a position of a preview region including the updated at least one first ROI based on a position of the estimated at least one first ROI matching the at least one first ROI detected in the first image.

2. The electronic device of claim 1, wherein the instructions, when executed by the at least one processor, cause the electronic device to:
upon detection of the at least one first ROI in the second image received through the camera module by using the first detector, determine whether the at least one first ROI detected in the first image matches the at least one first ROI detected in the second image, and
when the at least one first ROI detected in the first image matches the at least one first ROI detected in the second image, update the at least one first ROI detected in the second image to at least one first ROI.

3. The electronic device of claim 2, wherein the instructions, when executed by the at least one processor, cause the electronic device to, when the at least one first ROI detected in the first image does not match the at least one first ROI detected in the second image, update at least one first ROI by adding the at least one first ROI detected in the second image as a new first ROI.

4. The electronic device of claim 1, wherein the instructions, when executed by the at least one processor, cause the electronic device to, when the at least one first ROI detected in the first image does not match the at least one first ROI estimated based on the second ROI, update at least one first ROI by adding the estimated at least one first ROI, as a new first ROI.

5. The electronic device of claim 1, wherein the instructions, when executed by the at least one processor, cause the electronic device to:
when the at least one first ROI detected in the first image does not match the at least one first ROI estimated based on the second ROI, detect at least one third ROI in the second image by using a third detector for third ROI detection among the plurality of detectors, and estimate at least one second ROI based on the at least one third ROI,
estimate at least one first ROI based on the estimated at least one second ROI, and
when the at least one first ROI detected in the first image matches the estimated at least one first ROI, update the estimated at least one first ROI to at least one first ROI.

6. The electronic device of claim 1, wherein the instructions, when executed by the at least one processor, cause the electronic device to:
calculate a size of the first ROI based on a size of the second ROI and a predetermined ratio,
calculate a position of the first ROI based on a position of the second ROI and a predetermined ratio, and
estimate the first ROI from the second ROI based on the calculated size and position of the first ROI.

7. The electronic device of claim 1, wherein the instructions, when executed by the at least one processor, cause the electronic device to, when the first ROI is set from among a plurality of ROIs, determine the first detector for first ROI detection as a main detector,
determine an order for using the remaining detectors of the plurality of detectors, and
detect the first ROI by using the remaining detectors of the plurality of detectors in the determined order.

8. The electronic device of claim 1, wherein the instructions, when executed by the at least one processor, cause the electronic device to, when the plurality of detectors are determined as main detectors, detect at least one first ROI matching the at least one first ROI detected in the first image in the second image received through the camera module by using the plurality of detectors simultaneously.

9. The electronic device of claim 8, wherein the instructions, when executed by the at least one processor, cause the electronic device to, when the at least one first ROI detected in the first image matches the at least one first ROI detected by using the plurality of detectors, update the at least one first ROI detected by using the plurality of detectors to at least one first ROI.

10. A method for capturing an image in an electronic device including a plurality of detectors, the method comprising:
determining a first detector among the plurality of detectors as a main detector;
determining at least one detector, except for the first detector, among the plurality of detectors, as an auxiliary detector;
identifying an order of the plurality of detectors including the first detector and the at least one detector;

detecting at least one first region of interest (ROI) in a first image received through a camera module by using a first detector for first ROI detection among a plurality of detectors;

when failing to detect at least one first ROI matching the at least one first ROI detected in the first image in a second image received through the camera module by using the first detector, identifying a second detector for second ROI detection among the at least one detector determined as the auxiliary detector, and detecting at least one second ROI in the second image by using the second detector instead of the first detector;

estimating at least one first ROI based on the at least one second ROI;

when the at least one first ROI detected in the first image matches the estimated at least one first ROI, updating the estimated at least one first ROI to at least one first ROI; and changing a position of a preview region including the updated at least one first ROI based on a position of the estimated at least one first ROI matching the at least one first ROI detected in the first image.

11. The method of claim 10, further comprising:

upon detection of the at least one first ROI in the second image received through the camera module by using the first detector, determining whether the at least one first ROI detected in the first image matches the at least one first ROI detected in the second image; and when the at least one first ROI detected in the first image matches the at least one first ROI detected in the second image, updating the at least one first ROI detected in the second image to at least one first ROI.

12. The method of claim 11, further comprising, when the at least one first ROI detected in the first image does not match the at least one first ROI detected in the second image, updating at least one first ROI by adding the at least one first ROI detected in the second image, as a new first ROI.

13. The method of claim 10, further comprising, when the at least one first ROI detected in the first image does not match the at least one first ROI estimated based on the second ROI, updating at least one first ROI by adding the estimated at least one first ROI as a new first ROI.

14. The method of claim 10, further comprising:

when the at least one first ROI detected in the first image does not match the at least one first ROI estimated based on the second ROI, detecting at least one third ROI in the second image by using a third detector for third ROI detection among the plurality of detectors, and estimating at least one second ROI based on the at least one third ROI;

estimating at least one first ROI based on the estimated at least one second ROI; and when the at least one first ROI detected in the first image matches the estimated at least one first ROI, updating the estimated at least one first ROI to at least one first ROI.

15. The method of claim 10, wherein the estimation of the first ROI comprises:

calculating a size of the first ROI based on a size of the second ROI and a predetermined ratio;

calculating a position of the first ROI based on a position of the second ROI and a predetermined ratio; and estimating the first ROI from the second ROI based on the calculated size and position of the first ROI.

16. The method of claim 10, further comprising:

identifying an order of applying remaining detectors of the plurality of detectors other than the first detector.

17. The method of claim 10, further comprising, detecting at least one first ROI matching the at least one first ROI detected in the first image in the second image received through the camera module by using the plurality of detectors simultaneously.

18. The method of claim 17, further comprising, when the at least one first ROI detected in the first image matches the at least one first ROI detected by using the plurality of detectors, updating the at least one first ROI detected by using the plurality of detectors to at least one first ROI.

19. The method of claim 14, wherein the plurality of detectors include face detectors, and wherein the first ROI, the second ROI, and the third ROI include face regions.

20. At least one non-transitory storage medium storing instructions which are configured to, when executed by at least one processor, cause the at least one processor to perform at least one operation, wherein the at least one operation includes:

determining a first detector among a plurality of detectors as a main detector;

determining at least one detector, except for the first detector, among the plurality of detectors; as an auxiliary detector;

identifying an order of the plurality of detectors including the first detector and the at least one detector;

detecting at least one first region of interest (ROI) in a first image received through a camera module by using a first detector for first ROI detection among a plurality of detectors;

when failing to detect at least one first ROI matching the at least one first ROI detected in the first image in a second image received through the camera module by using the first detector, terminating a function of the first detector, identifying a second detector for second ROI detection among the at least one detector determined as the auxiliary detector, and detecting at least one second ROI in the second image by using the second detector instead of the first detector;

estimating at least one first ROI based on the at least one second ROI;

when the at least one first ROI detected in the first image matches the estimated at least one first ROI, updating the estimated at least one first ROI to at least one first ROI; and changing a position of a preview region including the updated at least one first ROI based on a position of the estimated at least one first ROI matching the at least one first ROI detected in the first image.

* * * * *